United States Patent
Gilson

(10) Patent No.: US 10,917,180 B2
(45) Date of Patent: Feb. 9, 2021

(54) CONTROLLING VIBRATION OUTPUT FROM A COMPUTING DEVICE

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/043,235

(22) Filed: Jul. 24, 2018

(65) Prior Publication Data

US 2020/0036451 A1    Jan. 30, 2020

(51) Int. Cl.
*H04B 11/00* (2006.01)
*H04W 76/14* (2018.01)
*H04M 1/725* (2021.01)
*H04W 8/00* (2009.01)
*H04W 84/20* (2009.01)

(52) U.S. Cl.
CPC ........ *H04B 11/00* (2013.01); *H04M 1/72577* (2013.01); *H04W 8/005* (2013.01); *H04W 76/14* (2018.02); *H04W 84/20* (2013.01)

(58) Field of Classification Search
CPC ........ G08C 23/02; G08C 19/12; G08C 19/28; G08C 17/02; G08C 19/14; G08C 2201/31; G08C 2201/93; G08C 19/18; G08C 2201/112; G08C 2201/114
USPC ........................................................ 367/199
See application file for complete search history.

(56) References Cited

U.S. PATENT DOCUMENTS

| | | | | |
|---|---|---|---|---|
| 8,340,650 | B2 * | 12/2012 | Yamashita | H04W 48/16 370/320 |
| 8,386,620 | B2 * | 2/2013 | Chatterjee | G06Q 30/02 709/228 |
| 8,451,103 | B2 * | 5/2013 | Hwang | H04M 19/047 340/407.1 |
| 8,479,274 | B2 * | 7/2013 | Furukawa | G06F 21/32 726/9 |
| 8,754,757 | B1 * | 6/2014 | Ullrich | G06F 16/683 340/407.1 |
| 9,037,455 | B1 * | 5/2015 | Faaborg | G01C 21/3629 704/208 |
| 9,154,960 | B2 * | 10/2015 | Shibuya | H04W 48/16 |
| 9,355,418 | B2 * | 5/2016 | Logan | G06Q 50/12 |
| 9,496,842 | B2 * | 11/2016 | Sudo | H04R 17/00 |
| 9,521,529 | B1 * | 12/2016 | Dunn | H04M 1/72552 |
| 9,872,110 | B2 * | 1/2018 | Fukami | B06B 1/0253 |
| 9,911,291 | B2 * | 3/2018 | Lim | G08B 6/00 |
| 10,596,459 | B2 * | 3/2020 | Kurihara | A63F 13/533 |
| 10,609,205 | B2 * | 3/2020 | Camacho Perez | H04M 1/72563 |
| 2005/0048998 | A1 * | 3/2005 | Zhu | H04M 1/72552 455/550.1 |
| 2009/0169018 | A1 * | 7/2009 | Deisher | H04L 63/0869 380/278 |
| 2010/0285784 | A1 * | 11/2010 | Seo | H04M 1/72563 455/414.1 |

(Continued)

Primary Examiner — Chico A Foxx
(74) Attorney, Agent, or Firm — Banner & Witcoff, Ltd.

(57) ABSTRACT

Systems, apparatuses, and methods are described for controlling vibrations output by one or more computing devices. A plurality of computing devices may form an ad hoc group using vibration signals. A computing device may suspend generation of a tactile vibration and/or sound as a notification of a received communication or other event.

21 Claims, 16 Drawing Sheets

(56) References Cited

U.S. PATENT DOCUMENTS

| | | | |
|---|---|---|---|
| 2011/0134063 A1* | 6/2011 | Norieda | G06F 3/0433 345/173 |
| 2012/0126960 A1* | 5/2012 | Steger | G10H 1/40 340/407.1 |
| 2013/0006622 A1* | 1/2013 | Khalil | G10L 19/012 704/233 |
| 2013/0207792 A1* | 8/2013 | Lim | G06F 3/011 340/407.1 |
| 2014/0220940 A1* | 8/2014 | Baisuck | H04W 4/12 455/412.1 |
| 2014/0260642 A1* | 9/2014 | Goel | G01H 11/06 73/658 |
| 2014/0266644 A1* | 9/2014 | Heubel | G08B 6/00 340/407.1 |
| 2014/0313862 A1* | 10/2014 | Rahimi | G08C 23/02 367/199 |
| 2014/0359272 A1* | 12/2014 | Hiltunen | G09C 1/00 713/150 |
| 2015/0035748 A1* | 2/2015 | Yoon | H04M 1/72569 345/156 |
| 2015/0085619 A1* | 3/2015 | Jeong | G08C 23/02 367/198 |
| 2015/0085620 A1* | 3/2015 | Macours | H03G 3/3005 367/199 |
| 2015/0098308 A1* | 4/2015 | Herman | G08C 17/02 367/197 |
| 2015/0256338 A1* | 9/2015 | Roberts | H04W 12/003 713/171 |
| 2015/0270908 A1* | 9/2015 | Chang | H04B 11/00 367/199 |
| 2016/0142157 A1* | 5/2016 | Jeong | H04B 11/00 367/199 |
| 2016/0180661 A1* | 6/2016 | Ullrich | G08B 6/00 340/407.1 |
| 2016/0187191 A1* | 6/2016 | Liu | G01H 11/08 73/658 |
| 2017/0045956 A1* | 2/2017 | Yoon | G06F 3/017 |
| 2017/0110990 A1* | 4/2017 | Hu | H02P 5/74 |
| 2017/0188198 A1* | 6/2017 | Matsubara | H04M 1/72522 |
| 2017/0242405 A1* | 8/2017 | Shirai | A63B 71/0686 |
| 2017/0359439 A1* | 12/2017 | Beach | G06Q 10/10 |
| 2018/0081444 A1* | 3/2018 | Youoku | G06F 3/038 |
| 2018/0132287 A1* | 5/2018 | Cheng | H04W 12/003 |
| 2020/0042086 A1* | 2/2020 | Bastide | G06F 3/016 |
| 2020/0104194 A1* | 4/2020 | Chalmers | G06F 3/0346 |

* cited by examiner

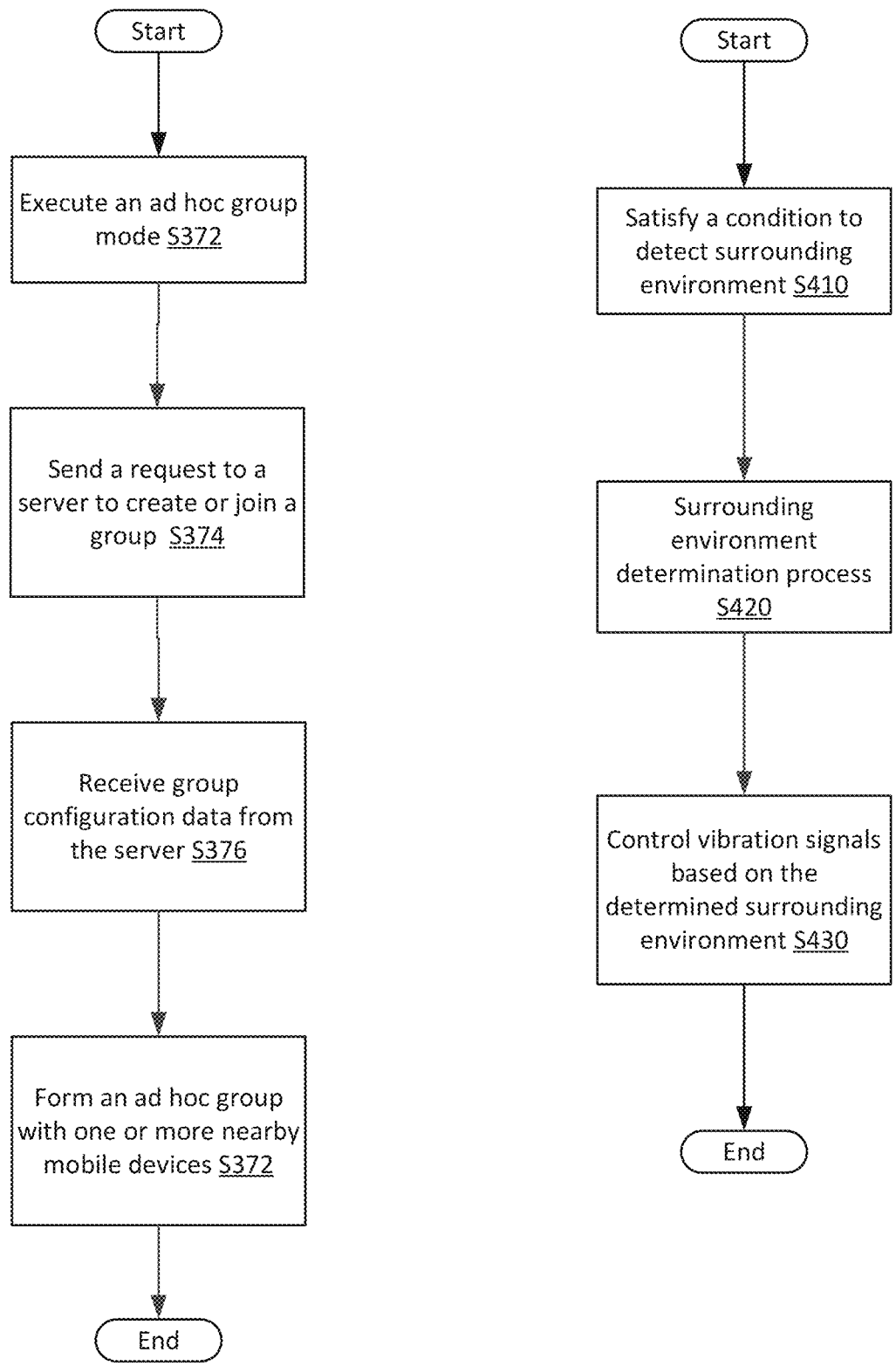

CONTROLLING VIBRATION OUTPUT FROM A COMPUTING DEVICE

BACKGROUND

In a meeting or other gathering, an individual may check his or her mobile device when a ringtone or vibration is generated by another person's mobile device. For example, in a conference room, some meeting participants may put their mobile phones on a table, and many of those mobile phones may vibrate or generate a notification sound during the course of the meeting. Uncontrolled vibration signals or sounds generated by a plurality of mobile phones may be disruptive and distracting.

SUMMARY

The following presents a simplified summary of certain features. The summary is not an extensive overview, and is not intended to identify key or critical elements.

Systems, apparatuses, and methods are described for controlling vibration output by of computing devices. A temporary communication network may be established among an ad hoc group of computing devices by sensing vibration signals generated by those computing devices. Computing devices in the ad hoc group may have unique vibration patterns that may be used in communications with other computing devices in the group. Computing devices may suspend generation of a tactile vibration and/or sound as a notification of a received communication or other event, but may output a visual notification of the event during that suspension. Computing devices may change a notification mode to a different notification mode (e.g., a vibration mode, or a sound mode) based on ambient conditions, may set a common notification time window in which computing devices in an ad hoc group may generate vibrations, may set up short-range wireless communication connections using vibration signals, and/or may perform other operations.

These and other features and advantages are described in greater detail below.

BRIEF DESCRIPTION OF THE DRAWINGS

Some features herein are illustrated by way of example, and not by way of limitation, in the accompanying drawings. In the drawings, like numerals reference similar elements.

FIGS. 3A to 3C are a flow charts showing example methods for forming an ad hoc group.

FIG. 4 is a flow chart showing an example method for determining a surrounding environment and controlling vibration signals of one or more mobile devices.

DETAILED DESCRIPTION

Figure 1A:
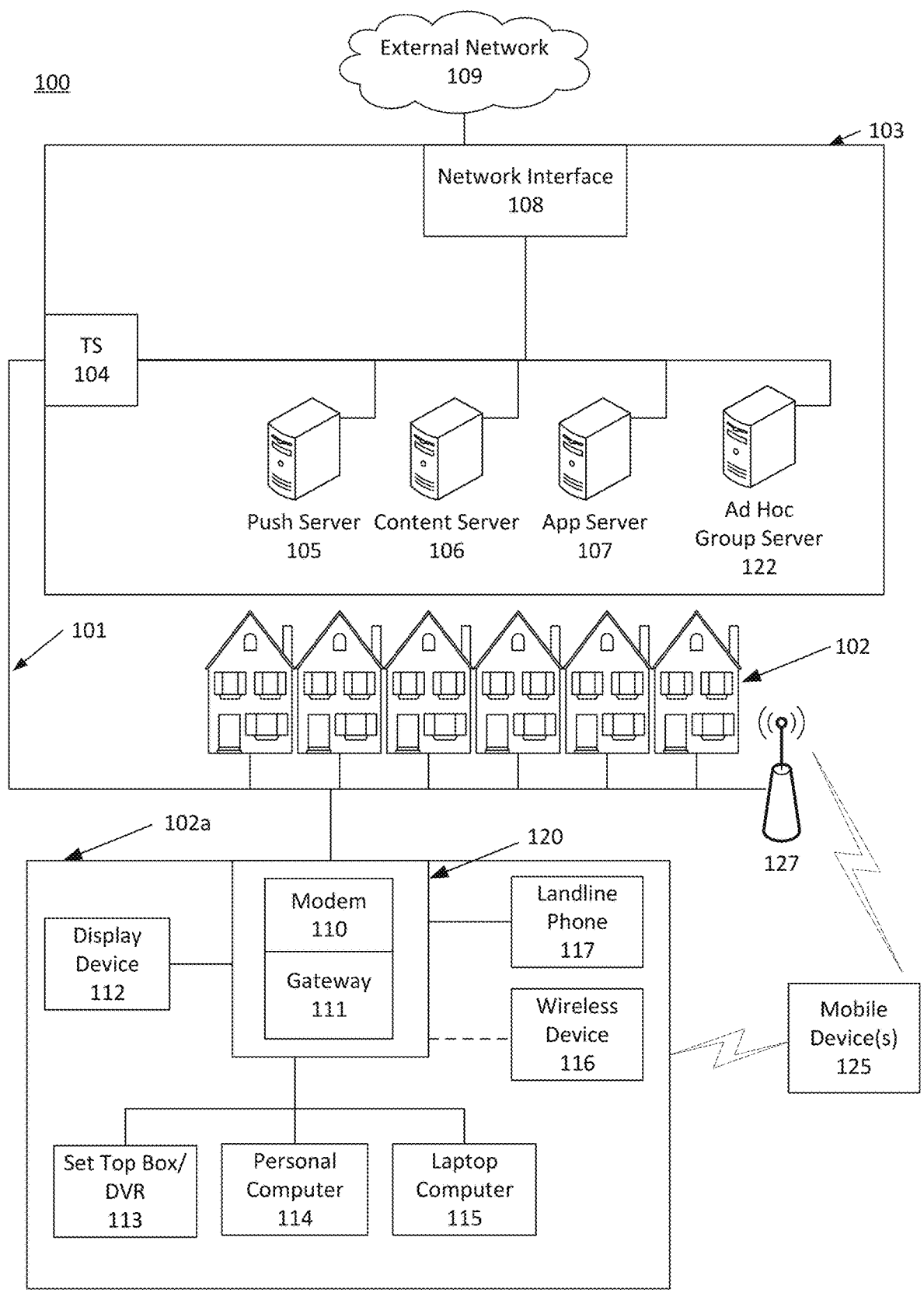
FIG. 1A shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1A shows an example communication network 100. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc. to help convey signals clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels. The mobile device 125 may be a mobile device such as one of the mobile devices 225 described in connection with FIG. 2 and/or one of the mobile devices described in connection with other FIGS.

The local office 103 may include an interface 104, such as a termination system (TS). The interface 104 may be a cable modem termination system (CMTS), which may be a computing device configured to manage communications between devices on the network of the communication links 101 and backend devices such as servers 105-107 and 122. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to users at their premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including an ad hoc group server 122 (described below), additional push, content, and/or application servers, and/or other types of servers. Although shown separately, the push server 105, the content server 106, the application server 107, the ad hoc group server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premise 102*a* may include an interface 120. The interface 120 may include any communication circuitry needed to allow a device to communicate on one or more of the links 101 with other devices in the network. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. A plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102*a* may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the ad hoc group server 122. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

The ad hoc group server 122 may be a computing device that performs operations that enable formation of ad hoc groups of mobile devices. An ad hoc group of mobile devices may be a temporary group that may be formed when users of those device are meeting, traveling, visiting, and/or engaged in other activities in which the mobile devices are in the same room or otherwise in relatively close proximity (e.g., in the same vehicle). An ad hoc group may be formed based on vibration signals communicated between a plurality of mobile devices 125. The ad hoc group server 122 may be centrally located in the local office 103. Additionally or alternatively, there may be multiple ad hoc group servers 122 that have the same or similar functionality but that are located at different access points 127, premises 102, edge servers (e.g., as an add-in), and/or other locations.

Figure 1B:
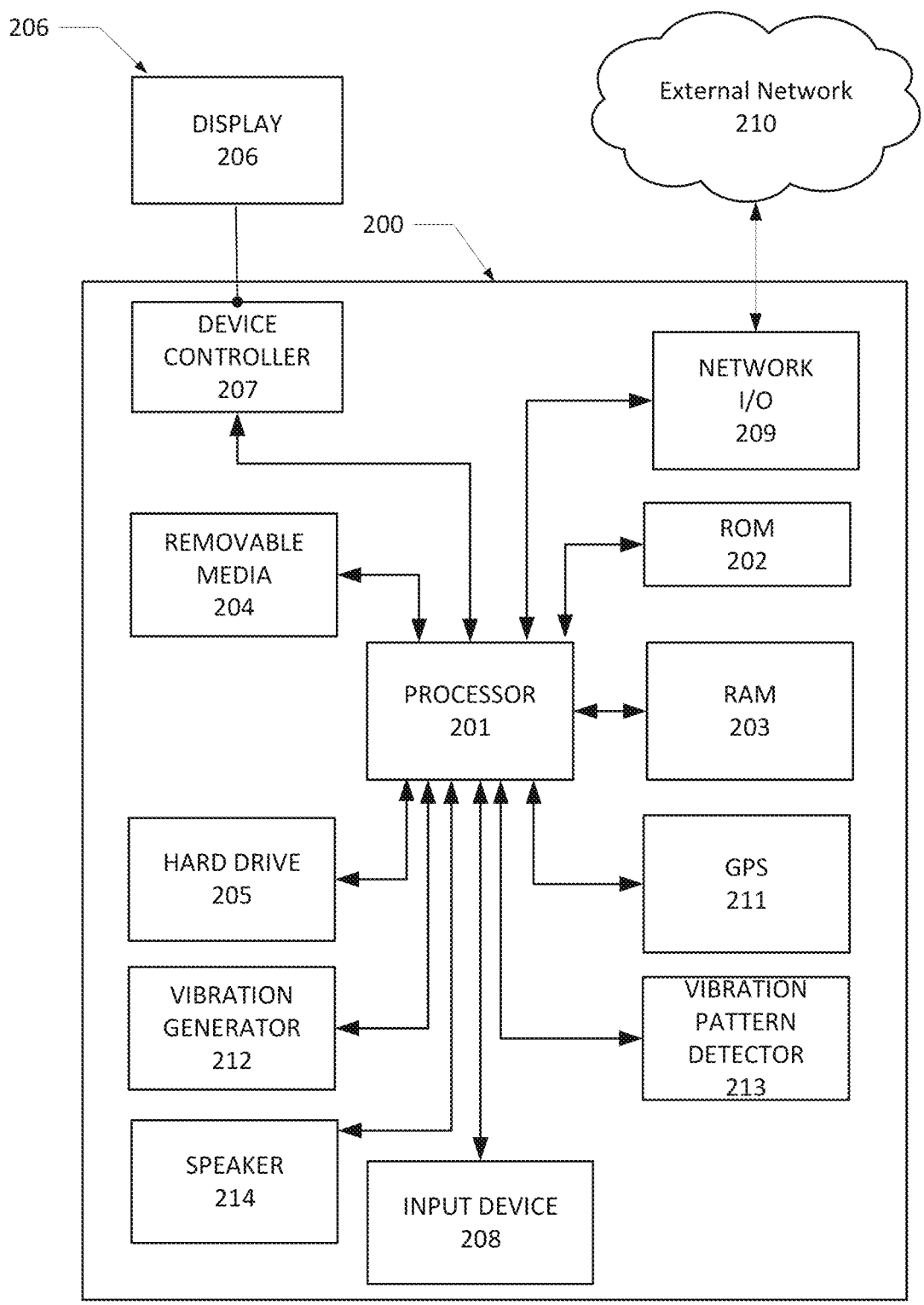
FIG. 1B shows hardware elements of an example computing device.

FIG. 1B shows hardware elements of an example computing device (e.g., the ad hoc group server 122, a mobile device 125, any of the other mobile devices described herein, etc.). The computing device 200 may include one or more processors 201, which may execute instructions of a computer program to cause the computing device 200 perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The computing device 200 may detect and generate various types of mechanical vibrations of physical objects (e.g., furniture, walls, floors, parts of a user's body, clothing) and/or of a surrounding environment (e.g., air). Vibrations may include sound, which may be audible or inaudible. Sound may be inaudible because of amplitude level, e.g., loudness. Sound may also or alternatively be inaudible because of frequency, e.g., it may be outside of a frequency range generally audible to humans. Vibrations may also include tactile vibrations that can be felt or sensed by an individual's sense of touch. A vibration may, but need not necessarily, have both tactile vibration and sound components.

The computing device 200 may include a tactile vibration generator 212. The tactile vibration generator 212 may include a motor that has an imbalanced rotating part that may cause the mobile device to vibrate when the imbalanced rotating part is rotating. The tactile vibration generator 212 may include other types of vibration generating parts, such as a linear oscillating vibrator. A speaker 214 may generate sound, including sounds at inaudible frequencies (e.g. low frequency or high-frequency sound waves outside of the sound range of a human ear). The tactile vibration generator 212 may be activated by the processor 201 to generate a unique vibration pattern, as described below. The speaker 214 may generate various infrasound patterns ("the low-frequency sound waves") or ultrasound patterns ("the high-frequency sound waves"). A microphone of the input device 208 may detect audible and/or inaudible sounds.

The computing device 200 may include a vibration pattern detector 213 that detects a vibration pattern of a received vibration signal. The vibration pattern detector 213 may sense one or more vibration signals from the surrounding environment using one or more vibration sensors, such as a piezo vibration sensor, an accelerometer, etc. Further, the vibration pattern detector 213 may include a microphone or other vibration sound detecting sensors to detect vibrations, including sounds. The vibration pattern detector 213 may also include one or more digital signal processors and/or other processors configured to identify vibration patterns. The computing device 200 may also sense a noise level of the surrounding environment using a microphone or other sound sensors. The noise level may be calculated as sound intensity within a threshold distance from the computing device 200. For example, the computing device 200 may determine sound energy per time by detecting sound generated within an area around the computing device 200. The area may be a space within the threshold distance from the computing device 200. The threshold distance may be determined based on a detection range of a vibration detector, a microphone or other sound sensors.

In combination with processor 201, the vibration pattern detector 213 may distinguish vibration signals of other mobile devices from vibration signals generated by other sources. For example, the computing device 200 may store information about vibration signals generated by and/or otherwise associated with other computing devices. Frequencies, vibration pulse patterns, sounds, and/or other characteristics of vibration signals may be preconfigured in each computing device, and/or each computing device may store data regarding such characteristics for itself and for other computing devices. For example, different types of mobile phones or other mobile devices may store preconfigured vibration patterns. The vibration pattern detector 213 may compare the received vibration signals with a stored list of vibration patterns and may determine whether the vibration pattern is generated by a certain type of mobile phone or other mobile device. One or more band-pass filters, high-pass filters, and/or low-pass filters may be used to detect vibration frequencies, vibration patterns and/or vibration sounds generated by computing devices. Vibrations signals, which may include patterns of vibration pulses that have varying pulse durations, frequencies, and/or amplitudes, may be used to communicate ad hoc group identifiers, mobile device identifiers, and other information between mobile devices.

Although FIG. 1B shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 1B may be implemented using basic computing devices and components that have been configured to perform operations such as are described herein. A memory of the computing device 200 may store computer-executable instructions that, when executed by the processor 201 and/or one or more other processors of the computing device 200, cause the computing device 200 to perform one, some, or all of the operations described herein. Memory and/or processor(s) may also or alternatively be implemented through one or more Integrated Circuits (ICs). An IC may be, for example, a microprocessor that accesses programming instructions or other data stored in a ROM and/or hardwired into the IC. An IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. An IC may be configured to output image data to a display buffer.

Figure 2:
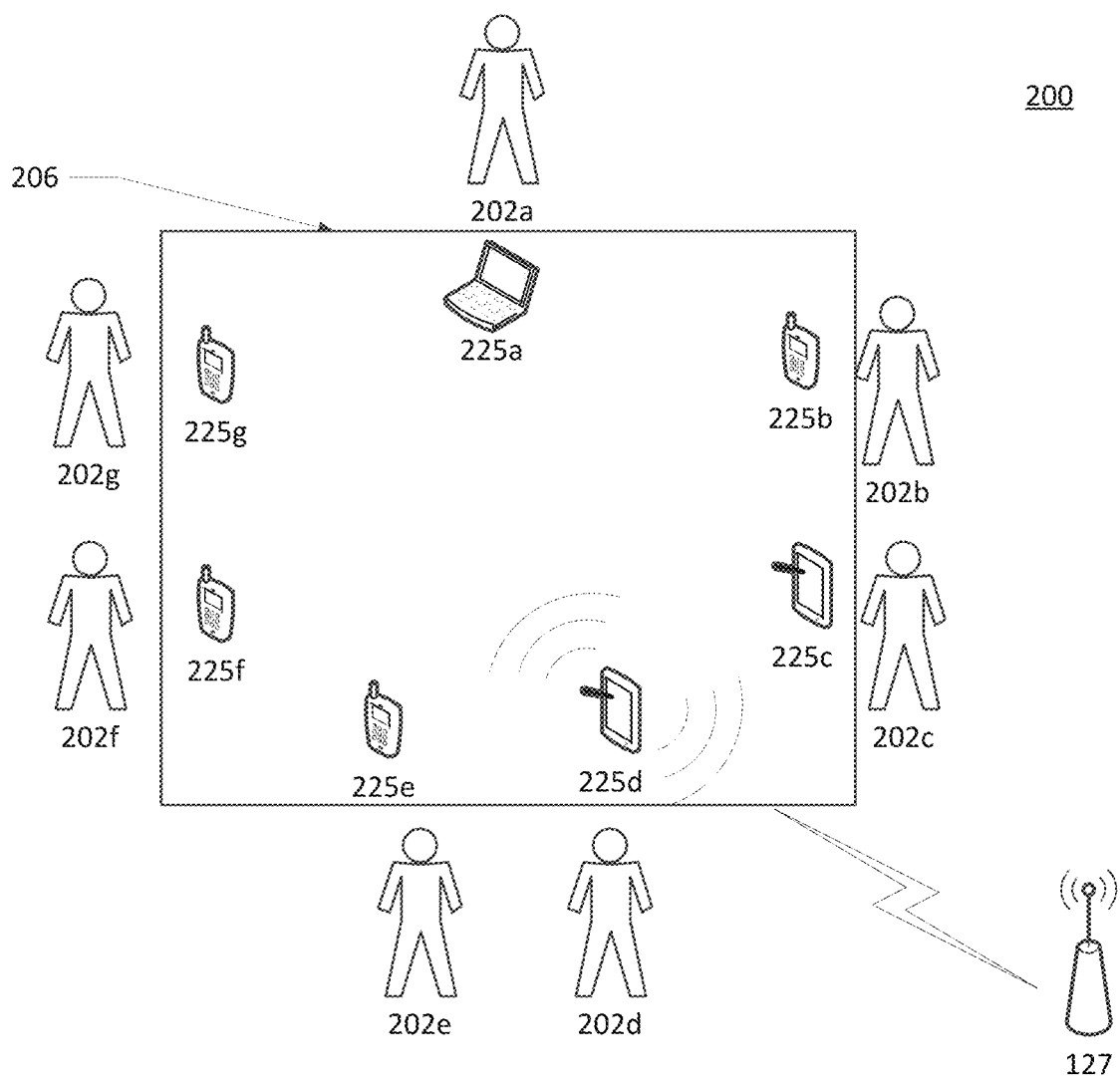
FIG. 2 shows an example of mobile device that may form an ad hoc group.

FIG. 2 shows an example of mobile device that may form an ad hoc group. In FIG. 2, individuals 202a-202g in a conference room may place their mobile devices 225 on a table 206. Throughout this description, elements identified using a common numerical designator and different appended letters (e.g., mobile devices 225a through 225g of FIG. 2) may referenced collectively (e.g., the mobile devices 225) or generically (e.g., a mobile device 225) using the numerical designator without an appended letter. Each of the mobile devices 225 may be a computing device. Although examples are described herein in connection with placement of mobile devices on a table in a conference room, other examples include scenarios where one or more mobile devices are placed on one or more other objects in one or more other types of locations. The conference room in the example of FIG. 2 may be one of the rooms in the premises 102a of FIG. 1 discussed above. The conference room may provide, via the access point 127, wireless services (e.g., Wi-Fi) to the mobile devices 225. Additionally or alternatively, the access point 127 may include a modem 110, a wireless device 116 (e.g., router, tablet, laptop, etc.), or a base station for a cellular network. The access point 127 may communicate with the local office 103 via the communication links 101. The access point 127 may communicate with the mobile devices 225 using one or more wireless signal protocols (e.g., a cellular communication protocol, a Wi-Fi communication protocol, or other radio frequency signal protocols). The ad hoc group server 122 may communicate with the mobile devices 225 using one or more wireless signal protocols and via the access point 127 or other types of wireless communication services. FIG. 2 merely shows an example of a scenario in which an ad hoc group may be formed. Additional examples are included below.

Using one or more sensors, the mobile devices 225 may recognize that they are placed on an object, e.g., a table. For example, the mobile device 225c may include one or more of an accelerometer, a gyroscope, a geomagnetic field sensor, or other types of orientation sensors. Using one or more of the above sensors, the mobile device 225c may determine that it is placed on an object and determine magnitude and direction of the acceleration. For example, some mobile phones include an accelerometer to sense three-dimensional acceleration data by measuring accelerations in the X, Y, and Z axes. When the mobile devices are placed on a table or other objects, the three-dimensional acceleration data may indicate substantially zero acceleration in each of the X, Y, and Z axes.

The mobile devices 225 placed on the table 206 may sense vibrations generated by other mobile devices. The mobile devices 225 placed on the table 206 may form an ad hoc group by generating and detecting vibration signals and may perform other operations described herein. For example, the mobile devices 225 may communicate by generating and detecting vibration signals within the ad hoc group. The mobile devices 225 may output various messages and may process other activities in the ad hoc group. Vibrations from mobile devices on a table or other hard surface may, based on resonating against the table or other hard surface, differ in frequency from ambient vibrations coming from other sources. This frequency difference may be used to discriminate vibrations from ad hoc group members relative to vibrations from other source.

Figure 3A:
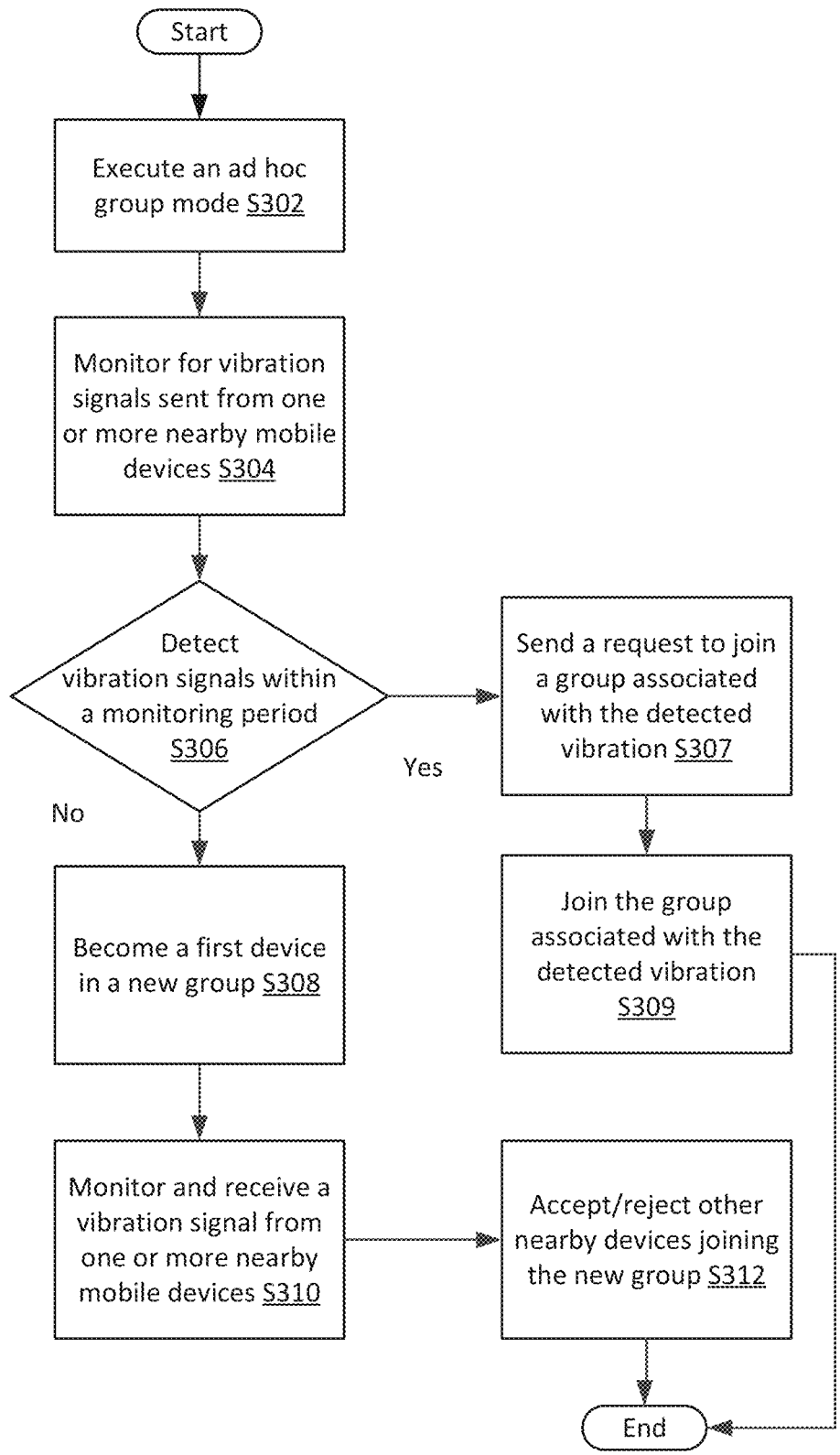

FIG. 3A is a flow chart showing an example method for forming an ad hoc group. The method of FIG. 3A may be separately performed by each of multiple mobile devices (e.g., the mobile devices shown in FIG. 2) in connection with forming an ad hoc group. In step S302, a mobile device may enable an ad hoc group mode in which a mobile device may form an ad hoc group with one or more nearby mobile devices. For example, an ad hoc group application may execute on a mobile device and may perform operations in connection with joining an ad hoc group, as well as other operations described herein. A user of the mobile device may provide input to that ad hoc group application to enable the ad hoc group mode. Additionally, or alternatively, the mobile device may automatically enable the ad hoc group mode periodically or by an event to start the ad hoc mode, e.g., if the mobile device is placed on an object (e.g., the table 206 in FIG. 2) for more than a threshold time.

In step S304, the mobile device may monitor for a vibration signal sent from a nearby mobile device that has already created an ad hoc group. In step S306, the mobile device may determine whether a vibration signal is detected within a monitoring period. If the mobile device does not detect a vibration signal from a nearby mobile device within the monitoring period, the mobile device may determine to become a first device in a new ad hoc group in step S308. As part of step S308, the mobile device may generate and send a vibration signal indicating the ad hoc group and the ability of nearby devices to join. In step S310, the mobile device may monitor and receive one or more vibration signals from one or more nearby mobile devices seeking to join the ad hoc group. The mobile device may add nearby mobile devices to the ad hoc group in step S312. As part of step S312, the mobile device may send vibration signals to the nearby mobile devices indicating that those nearby mobile devices are part of the ad hoc group and/or providing other data regarding the ad hoc group (e.g., notification time windows, identifying information regarding other devices in the ad hoc group, and/or other types of information described herein).

If the mobile device detects a vibration signal within the monitoring period in step S306 (e.g., a vibration signal from a nearby mobile device performing step S308), in step S307 the mobile device may send a vibration signal indicating a request to join an ad hoc group associated with the detected vibration signal. In step S309, the mobile device may join the group associated with the detected vibration. As part of step S309, the mobile device may receive a vibration signal such as is described above in connection with step S312.

Figure 3B:
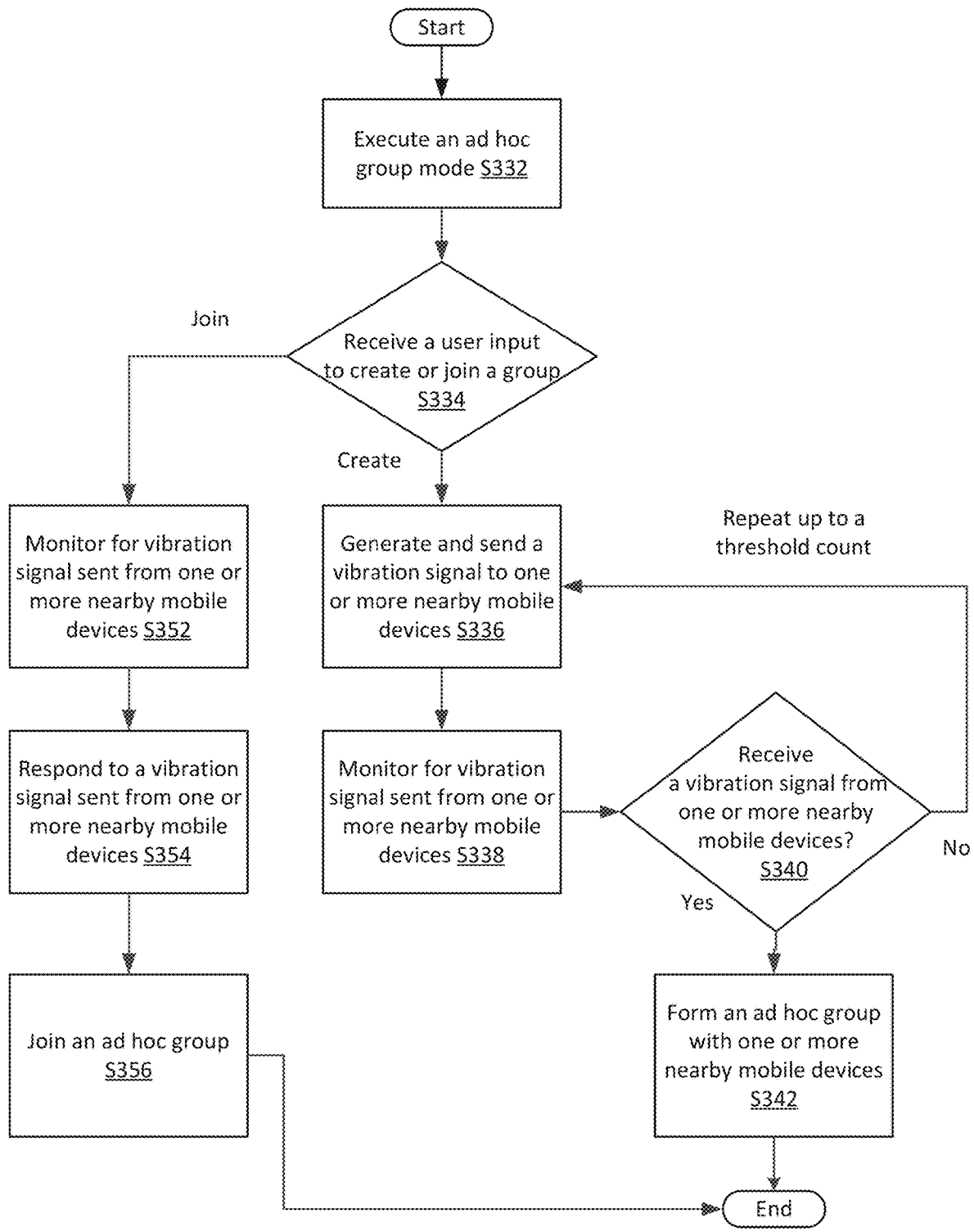

FIG. 3B is a flow chart showing another example method for forming an ad hoc group. The method of FIG. 3B may be separately performed by each of multiple mobile devices (e.g., the mobile devices shown in FIG. 2) in connection with forming an ad hoc group. In step S332, a mobile device may enable an ad hoc group mode similar to step S302 in FIG. 3A. In step S334, the mobile device may receive a user input, via a user interface of the mobile device, to create or join an ad hoc group. If the mobile device receives a user input to create a new group in step S334, the mobile device may generate and send a vibration signal to one or more nearby mobile devices in step S336. The vibration signal of step S336 may indicate the existence of an ad hoc group and that other mobile devices can join that ad hoc group. In step S338, the mobile device may monitor for one or more vibration signals, sent from one or more nearby mobile devices in step S338, indicating requests to join the ad hoc group. In step S340, the mobile device may determine whether it receives vibration signals from one or more nearby mobile devices. If yes, the mobile device may add the one or more nearby mobile devices sending the received vibration signals to the ad hoc group in step S342. As part of step S342, the mobile device may send vibration signals to the nearby mobile devices indicating that those nearby mobile devices are part of the ad hoc group and/or providing other data regarding the ad hoc group. If the mobile device does not receive a vibration signal in step S340, the mobile device may perform step S336 again. The repetition of step S336 may be performed up to a threshold count. If the threshold count is satisfied without having detected vibration signals from nearby mobile devices, the mobile device may output an indication to a user (e.g., on a display of the mobile device) indicating no other devices have been detected, and the method of FIG. 3B may be terminated.

If the user input received in step S334 indicated that an ad hoc group should be joined, the mobile device may monitor for vibration signals from a mobile device that is managing the ad hoc group (e.g., a mobile device performing step S336). In step S354 the mobile device may respond to a vibration signal sent from another mobile device managing the ad hoc group. In step S356, the mobile device may transmit one or more vibration signals to the managing mobile device and join the ad hoc group.

FIG. 3C is a flow chart showing another example method for forming an ad hoc group using an ad hoc group server 122. The method of FIG. 3C may be separately performed by each of multiple mobile devices (e.g., the mobile devices shown in FIG. 2) in connection with forming an ad hoc group. In step S372, a mobile device may enable an ad hoc group mode similar to step S302 in FIG. 3A. In step S374, the mobile device may send a request to a server, e.g., the ad hoc group server 122 in FIG. 1A, to create or join an ad hoc group. For example, the mobile device may send a request to create a new ad hoc group by sending group information. The group information may include one or more identities of other devices to be added in the group (e.g., a phone number, a MAC address, an IMEI number, and/or other identification data of a nearby mobile device). The group information may include location data of the group (e.g., GPS position data, location of a building, a distance or range from the mobile device requesting the group creation). The group information may also include a group identifier.

The group identifier may include a code to verify other nearby devices to determine whether to accept or reject the other mobile devices. A managing mobile device may send a request to the ad hoc group server 122 for creating an ad hoc group. The group creation request may include a code generated by the managing mobile device and associated with the ad hoc group to be created. One or more nearby mobile devices may receive the code from the managing mobile device, via a vibration signal from the managing mobile device, and may send the code via a mobile communication, to the server 122. If the server 122 receives the code from one or more nearby mobile devices, the server 122 may allow the one or more nearby mobile devices sending that code to join the ad hoc group.

Additionally or alternatively, a code may be generated by the ad hoc group server 122 in response to receiving, from the managing mobile device, a request for creating an ad hoc group. The managing mobile device may receive that code from the ad hoc group server 122 and may send the code to one or more nearby mobile devices via a vibration signal. The one or more nearby devices may detect the code in the vibration signal and may send the code to the ad hoc group server 122 to join the ad hoc group. The ad hoc group server 122 may send the code to the one or more nearby mobile devices in proximity to the managing mobile device in response to a request for joining an ad hoc group. The one or more nearby mobile devices may send the code to the managing mobile device via a vibration signal. If the managing mobile device receives the code via the vibration signal, the managing mobile device may accept the one or more nearby mobile devices in the ad hoc group.

In step S376, the mobile device may receive group configuration data from the ad hoc group server 122. The group configuration data may include various types of data to configure an ad hoc group for devices located in proximity to each other. For example, the group configuration data may include at least part of the group identity information, e.g., the code described above.

Additionally or alternatively, a mobile device (or other types of computing device) may perform the functions of the ad hoc group server 122. For example, a mobile device 225 performing the functions of the ad hoc group server 122 may coordinate with other mobile devices 225 or other ad hoc groups. Ad hoc groups may be merged into one ad hoc group or an ad hoc group may be divided into a plurality of ad hoc groups based on a communication of managing mobile devices of the two or more ad hoc groups.

A mobile device may request to dissolve an ad hoc group after performing one or more transactions among members of the ad hoc group. Each member of the ad hoc group may leave the ad hoc group by leaving the location or by sending a "leave the group" notification to the ad hoc group server 122. A mobile device may leave an ad hoc group in any of various ways. A mobile device 225 may detect that it has been picked up from table 206 and, if not placed back on table within a threshold amount of time, cause an ad hoc group application to remove the mobile device from the ad hoc group. A mobile device may leave an ad hoc group if it detects an environmental condition inconsistent with group membership (e.g., a change in location based on GPS or other data, detection of darkness by a device camera indicative of being placed in a user's pocket, etc.). A user may provide input to an ad hoc group application that causes a mobile device to leave an ad hoc group. A mobile device that has left an ad hoc group may cease responding to vibration signals from mobile devices in the group and/or may cease performing other operations described herein.

The ad hoc group server 122 may determine that mobile devices are currently or predicted to be co-located for a time period (e.g., mobile devices may be traveling along the same route at the same time). In a gathering that includes a large number of mobile devices, multiple ad hoc groups may be created. Each group may be limited in size based on range of vibration signals. The ad hoc group server 122 may predict, e.g., based on a location of a mobile device (e.g., GPS location from the mobile device, etc.) and/or an event schedule that the mobile device will likely remain co-located with other identified mobile devices for the duration of the event. Mobile devices in a moving train or other vehicle may generate substantially similar GPS data changes. Such data may be used by the ad hoc group server 122 to categorize certain mobile devices into candidates for an ad hoc group. The location-based candidate prediction may be performed by the ad hoc group server 122 by tracking location data changes of mobile devices operating in the ad hoc group mode.

FIG. 4 is a flow chart showing an example method for determining a surrounding environment and controlling vibration signals of a mobile device. The method of FIG. 4 may be performed by a mobile device (e.g., any of mobile devices 225) that has joined an ad hoc group, or by a mobile device that has not joined an ad hoc group. In step S410, a mobile device may determine whether a condition to detect a surrounding environment is satisfied. For example, if a mobile device is placed on an object for more than a threshold time (e.g., 3 seconds), the mobile device may determine that a condition to determine a surrounding environment has been satisfied. Alternatively, or additionally, the surrounding environment determination process may be initiated periodically regardless of whether the mobile device is placed on a certain object for a threshold time.

In step S420, the mobile device may initiate a surrounding environment determination process to determine the surrounding environment using one or more sensors, I/O devices, and/or other components. The mobile device may use GPS data to determine a location and collect information about the surrounding environment based on the GPS locations of the mobile device. The mobile device may scan for one or more short-range wireless signals, such as Wi-Fi signals, Bluetooth signals, NFC signals, etc. Based on the information about the scanned short-range wireless signals, the mobile device may obtain more information about the surrounding environment. For example, a mobile device may recognize that the access point 127 is a Wi-Fi access point of a company meeting room where a user of the mobile device is participating in a meeting.

The mobile device may also determine a noise level of the surrounding environment. For example, the mobile device may recognize that the access point 127 is a Wi-Fi access point of a particular coffee shop in a shopping center and determine that the place has a medium noise level (e.g., a noise level greater than a first noise level threshold) by sensing music being played in the coffee shop. Different types of sounds, such as music, vehicle noises in streets, etc. may be analyzed to determine different types of surrounding environments.

A mobile device may determine a quantity of nearby mobile devices based on one or more vibration signals, sound signals, and/or radio frequency (RF) signals (e.g., Wi-Fi probe signals of unpaired Wi-Fi devices, keep-alive packet transmissions of paired Wi-Fi devices, uplink or sidelink transmissions in an LTE or other wide area wireless network) generated by the nearby mobile devices. A mobile device may determine types of locations, such as a quiet meeting room or a quiet library, a noisy restaurant, a taxicab having a medium noise level, a noisy train station, or other types of locations.

A mobile device may capture images of the surrounding environment using one or more cameras or other image capturing devices. For example, a camera of a mobile device may generate an image of a ceiling of a room when placed on an object or may detect that the mobile device is placed in a pocket or a carrier if a black image is captured. Further, one or more light emitting diode (LED) devices or other type of illumination device may generate pulsed light that conveys indoor location data and other types of information indicating the environment of the location. The mobile device may analyze the captured images and/or send the images to an image analysis server (e.g., the app server 107, the ad hoc group server 122, etc.) for analysis. Based on the analysis of one or more captured images and other sensed data described herein, the mobile device or image analysis server may determine a type of the surrounding environment, and a noise level of the surrounding environment. Based on the determination regarding the surrounding environment, the mobile device may change policies for vibration generation. For example, if the noise level of the surrounding environment is low, the mobile device may not generate an audible sound or tactile vibration and may defer generating that audible sound or tactile vibration until occurrence of a certain time window.

The surrounding environment determination may include a determination of a vibration communication space for an ad hoc group. In order to define a vibration communication space, the mobile device may filter vibration signals of nearby mobile devices based on threshold signal strength.

For example, a mobile device may determine that a vibration signal generated by a mobile device placed on the same table has signal strength greater than the threshold signal strength while determining that a vibration signal generated from a mobile device placed on another table has signal strength less than the threshold signal strength. The mobile device may form an ad hoc group for vibration communications while ignoring weak vibrations from other sources placed outside of the same object. Based on the setting of the threshold signal strength and/or uniform vibration signal generation settings by all nearby mobile devices, a vibration communication space (e.g., the table 206 in FIG. 2) may be determined for a group of mobile devices.

The surrounding environment determination may include a determination of surrounding location based on location data of the mobile device. The mobile device may recognize that it is placed on a table or another object in a conference room of a company or another organization based on one or more signals and data. For example, a Wi-Fi access point in a company may send a periodic wireless signal to allow one or more mobile devices to access the Wi-Fi access point. The periodic wireless signal may include an identity of the Wi-Fi access point for the company. The GPS data of the mobile device may indicate that it is located at a building of the company. A mobile device may recognize that it is placed on a table of a restaurant based on one or more signals and data, e.g., a Wi-Fi signal, GPS data, a vibration signal, etc. For example, specific vibration patterns may be generated by a plurality of vibrators in a fast-food restaurant to indicate that foods for customers are ready. Movie theaters may generate a different vibration pattern one or more times before starting a movie to indicate that the mobile devices are located in a movie theater. Such signals from restaurants, movie theaters, or other places may be used in determining the current location of a mobile device detecting such signals.

One or more types of scheduling information accessible by a mobile device may be utilized in assessing the surrounding environment. Some scheduling applications, memo applications, etc. may provide the mobile device with the schedule or assignments of the user of the mobile device, and the schedule or assignments of other users of other mobile devices. For example, mobile device may retrieve information about a project meeting appointment between 3:00-4:00 PM on a certain date. The names of the meeting participants and their mobile phone numbers may also be retrieved. At 2:45 PM, each of the mobile devices of the meeting participants may determine its surrounding environment and may determine whether a meeting participant associated with the mobile device is in a meeting room for the appointment. Other information, such as a Wi-Fi signal of the company and GPS data, may be utilized to confirm whether the meeting participants are in the meeting room. The mobile devices in the meeting room may determine such other information and may determine that they are located in the meeting room. One or more vibration signals generated by the mobile devices of other meeting participants may be sensed and utilized for the determination as well.

In step S430, a mobile device may control vibrations based on the determined surrounding environment. Different types and strengths of vibration signals may be determined for different surrounding environments. For example, in a quiet library, a human-inaudible sound signal (e.g., infrasonic and/or ultrasonic sound) may be generated or a low strength vibration signal may be generated. In a coffee shop where music is being played, the strength of the vibration signal may be stronger than that generated in a quiet library.

The mobile device may control the intensity of future vibration signals to be generated to provide a proper level of alert to the user of the mobile device and/or to provide a minimum level of vibration intensity to one or more nearby mobile devices. The mobile device may decrease the intensity of the vibration signal in response to determining that the internally generated vibration signal is too strong (e.g., the intensity of the vibration signal is greater than a threshold). For example, the mobile device may increase the intensity of future vibration signals when it senses loud noises of vehicles in the street (e.g., the intensity of the vibration signal is less than a noise level threshold for the noisy street environment). If the intensity of the internally generated vibration signal is too strong, one or more mobile devices other than intended target mobile devices may detect the vibration signal generated by the mobile device. For example, in a quiet library, a vibrating mobile device may intend to form an ad hoc group with other mobile devices placed on the same table. However, one or more mobile devices placed on another table may detect the vibration sound if the vibrating mobile device does not decrease the vibration signal strength. By changing the intensity of the vibration signal, mobile devices may control the communication range or distance using the intensity-controlled vibration signal.

Figure 5:
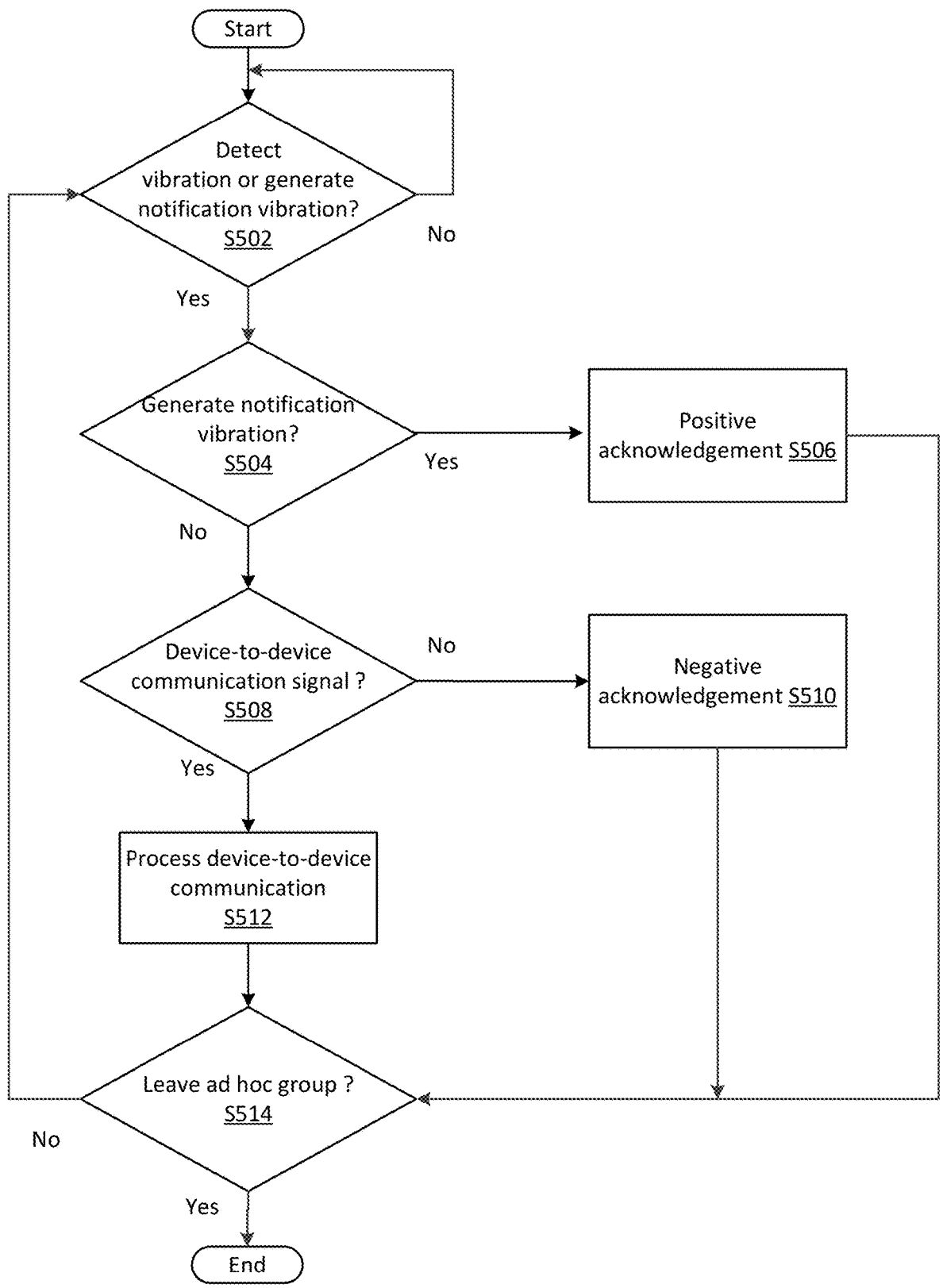
FIG. 5 is a flow chart showing an example method for processing one or more vibration signals with other mobile devices.

FIG. 5 is a flow chart showing an example method for processing one or more vibration signals. The method of FIG. 5 may be independently performed by each of multiple mobile devices in an ad hoc group (e.g., the mobile devices 225 in FIG. 2), and/or by a mobile device that has not joined an ad hoc group. In step S502, a mobile device may determine whether it has detected a vibration from another mobile device or whether it has generated a notification vibration. A notification vibration may be a vibration (e.g., a tactile vibration and/or a ringtone or other audible sound) generated by the mobile device to indicate an incoming call, message, or other communication directed to a user of the mobile device. A detected vibration may be a notification vibration generated by another mobile device, or may be a device-to-device communication from another mobile device. The mobile device may repeat step S502 until it detects a vibration from another mobile device or until it generates a notification vibration. The mobile device may perform step S504 based on detecting a vibration or generating a notification vibration.

In step S504 the mobile device may determine if it has generated a notification vibration. If it has, mobile device may perform a positive acknowledgement in step S506. The positive acknowledgement may enable the user of the mobile device to easily recognize that a notification vibration was generated by his/her mobile device. The mobile device may display an image or provide a notification to the user so that the user may readily recognize that the vibration signal was generated by the user's mobile device.

As part of a positive acknowledgement, the mobile device may display a blinking notification message for a certain time period after the termination of the vibration. The notification message may be output on a display screen and/or using one or more separate light sources (e.g., a light emitting diode, a camera flash). The visual signaling of the positive acknowledgement may be provided in a certain direction so that the notification may be individualized toward the user of the mobile device. A separate wearable device (e.g., a smart watch or electronic eye-glasses) paired with the mobile device may provide, to the user, an individualized notification for a certain time period after the termination of the vibration.

Additionally or alternatively, a mobile device may output a positive acknowledgement visual notification in response to movement of the mobile device within a certain time period after the mobile device generates a notification vibration. If the user ignores the notification vibration signal during the time period, the mobile device may not provide the positive acknowledgement because the user is likely not interested in checking the mobile device.

Figure 6A:
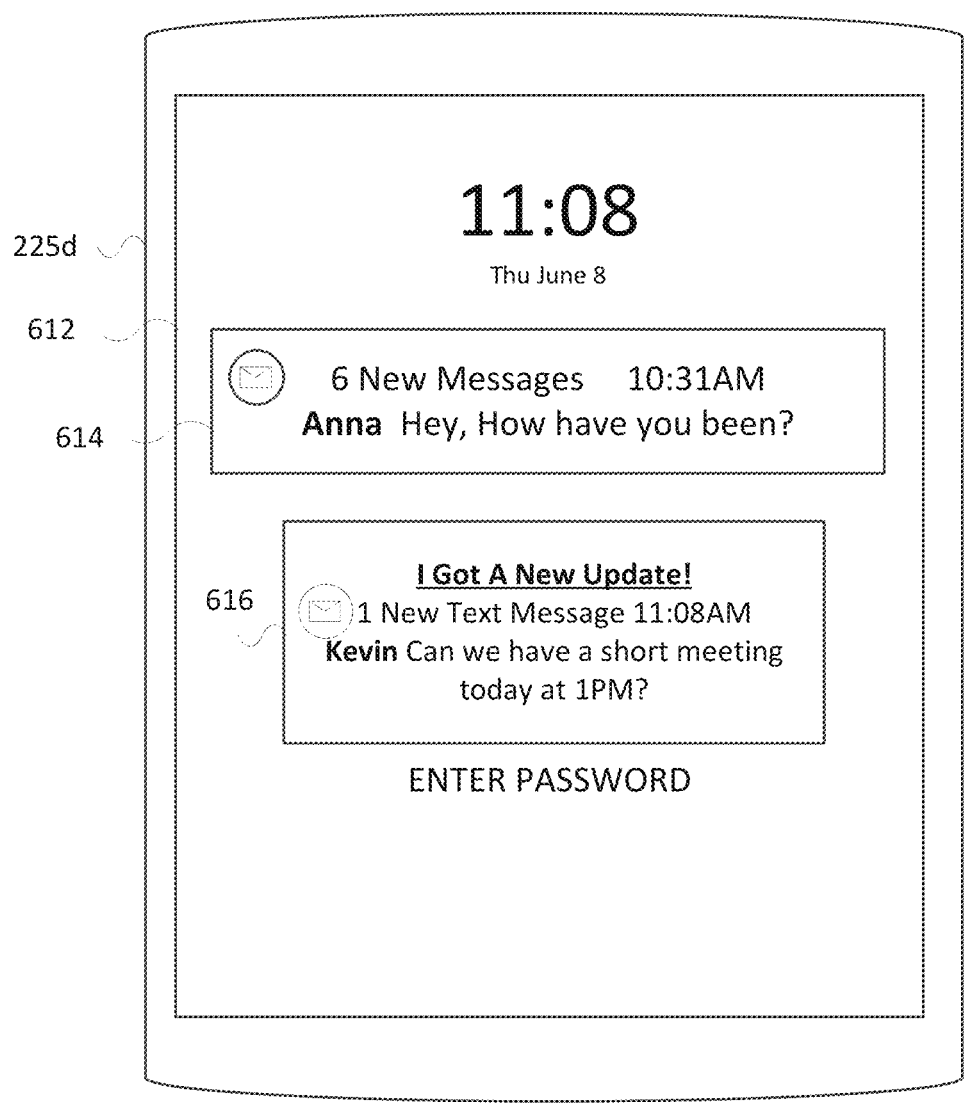
FIG. 6A shows an example device display outputting a positive acknowledgement.

FIG. 6A shows an example of a positive acknowledgement message output by mobile device 225d. The positive acknowledgement message may be output in a positive acknowledgement area 616 on a display screen 612. For example, the display screen 612 may display six unchecked messages in a notification box 614 received before generating a vibration signal. If the mobile device 225d determines a notification event (e.g., a reception of one or more emails, text messages, etc.), it may generate a notification vibration. A positive acknowledgement time window may start during or after generating the notification vibration. The positive acknowledgement time window may be a time period that starts when the mobile device 225d starts to generate the notification vibration to notify the user of a notification event. The positive acknowledgement time window may be longer than the notification vibration duration so that the user 202d may check the mobile device 225d after the termination of the notification vibration.

The six messages accumulated in the notification box 614 may have been received before generating the notification vibration. The notification vibration may be generated to notify the user of a new text message sent from Kevin, which may be displayed in the positive acknowledgement area 616. If the user 202d ignores the notification vibration during the positive acknowledgement time window, the positive acknowledgement area 616 may not be displayed and the new text message may be accumulated into the notification box 614 such that the notification box 614 displays "7 new messages" including a text of the new text message received from Kevin (e.g., the notification 624 in FIG. 6B).

If the mobile device determines in step S504 that it did not generate a notification vibration, the mobile device may proceed to step S508. In step S508, the mobile device may determine if the detected vibration signal is a notification vibration of another mobile device or a device-to-device communication signal from another mobile device. If the detected vibration signal is a notification vibration from another device in step S508, the mobile device may perform a negative acknowledgement in step S510. For example, in response to a notification vibration generated by one of the mobile devices 225a-c and 225e-g, the mobile device 225d may process a negative acknowledgement to advise user 202d that he/she need not unlock or otherwise interact with mobile device 225d based on the notification vibration. The negative acknowledgement may enable the user of the mobile device to avoid unnecessarily unlocking his/her mobile device after a notification vibration generated by another user's mobile device.

Figure 6B:
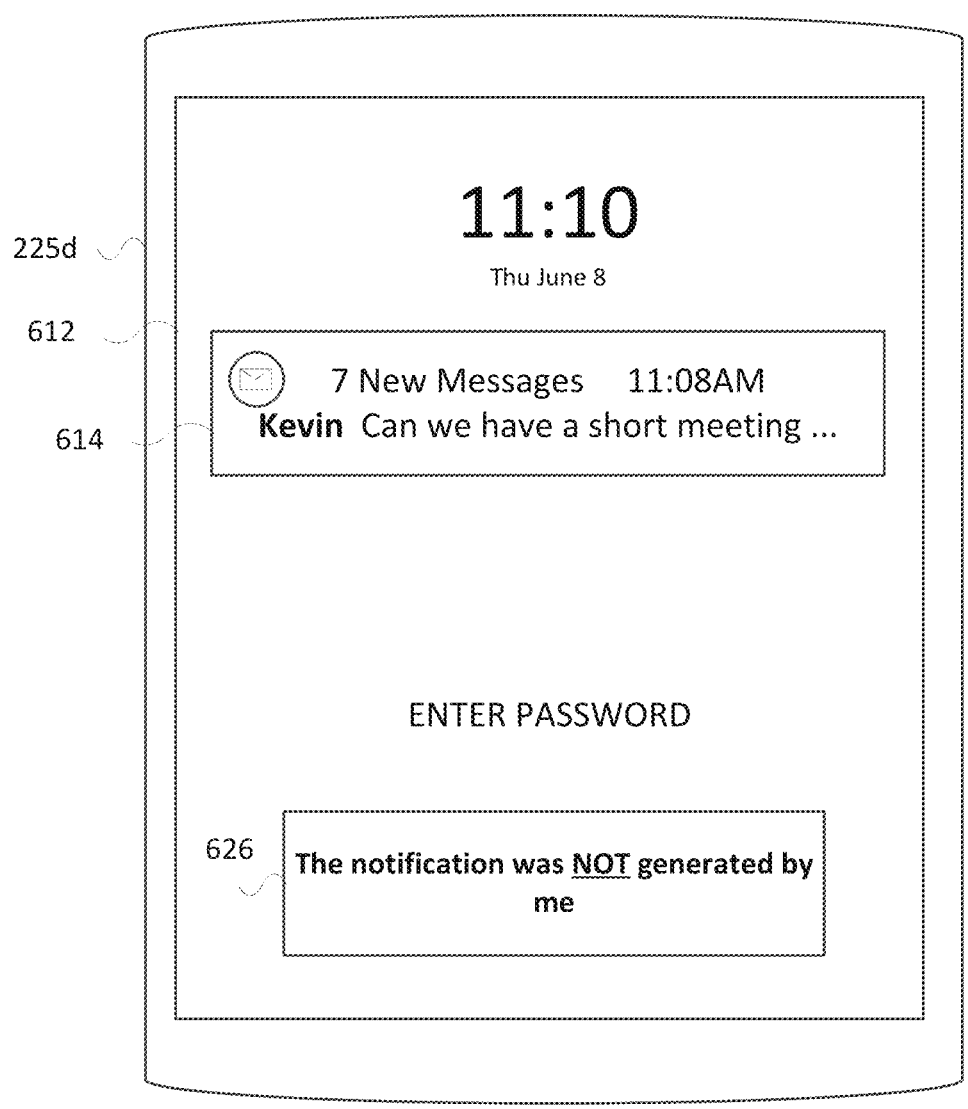
FIG. 6B shows an example device display outputting a negative acknowledgement.

FIG. 6B shows an example of a negative acknowledgement message ("The notification was not generated by me") output in a negative acknowledgement area 626 on the display screen 612 of the mobile device 225d. A negative acknowledgement time window may be a time period that starts when the mobile device 225d determines the notification vibration originated from another mobile device. The negative acknowledgement time window may be longer than the sensed vibration or ringtone sound duration so that the user may check the mobile device after the termination of the notification vibration by the other mobile device. For example, when the mobile device 225*d* senses a vibration signal generated by a nearby mobile device, it may start the negative acknowledgement time window for a preconfigured period (e.g., ten seconds). During the preconfigured period, the negative acknowledge area 626 may be displayed by the mobile device 225*d*. After the preconfigured period expires, the negative acknowledgement window in the negative acknowledgement area 626 may disappear.

The mobile device may automatically output, without a user input, the negative acknowledgement in response to the sensed notification vibration from another mobile device. Additionally or alternatively, the mobile device may output the negative acknowledgement when the user picks up the mobile device. The negative acknowledgement may be provided to the user if the user picks up the mobile device for checking within a certain period time after the mobile device sensed the notification vibration generated by the other mobile device. The negative acknowledgement may enable the user to quickly recognize that his/her mobile device has not generated the notification vibration and that the user need not unlock his/her device or take other action.

If the mobile device determines in step S508 (FIG. 5) that a detected vibration signal is a device-to-device communication, the mobile device may perform step S512. In step S512, the mobile device may process the detected device-to-device communication vibration signal. If the detected device-to-device communication vibration signal was intended for some other mobile device, then the processing of step S512 may comprise ignoring that signal and/or displaying a message, similar to a negative acknowledgment, indicating that no user action is needed. If the detected device-to-device communication vibration signal was intended for the mobile device performing step S512, then the mobile device may perform one or more operations based on the detected vibration signal. For example, a first mobile device may send, to a second mobile device, a vibration signal that includes or indicates a message to the second mobile device. The second mobile device may generate another vibration signal as a response to the received vibration signal. The second mobile device may also display a text message or a user interface that requests a user input in response to receiving the vibration signal from the first mobile device. For example, the first mobile device may generate the vibration signal to request a business card of the user of the second mobile device. The second mobile device may display a user interface that indicates the request from the first mobile device and may receive a user input to accept or reject the request. In step S514, the mobile device may determine whether to leave the ad hoc group. If the mobile device does not leave the ad hoc group, step S502 may be repeated.

A mobile device may support a sound mode, a tactile vibration mode, and a silent mode. In the sound mode, the mobile device may generate ringtone(s) and/or other audible sound(s) and/or tactile vibrations when the mobile device determines occurrence of an event that has, or that may potentially may have, an associated notification. Examples of events include a call, message, and/or other communication for a device user, time for a calendar appointment matching a current time, and/or any other event for which a user of a mobile device might receive notification. In the tactile vibration mode, the mobile device may generate a tactile vibration when the mobile device determines an event has occurred. In the silent mode, the mobile device may not generate any tactile vibration or sounds when the mobile device determines an event has occurred. However, the mobile device may still output messages on a display screen of the mobile device, cause a light to blink, and/or provide other visual indications during the silent mode. In the silent mode and/or in the tactile vibration mode, infrasound or ultrasound may be generated. In order to generate a vibration signal in response to a detected vibration in a device-to-device communication processing in e.g., step S512, the mobile device may change its notification mode to the tactile vibration mode.

Figure 7:
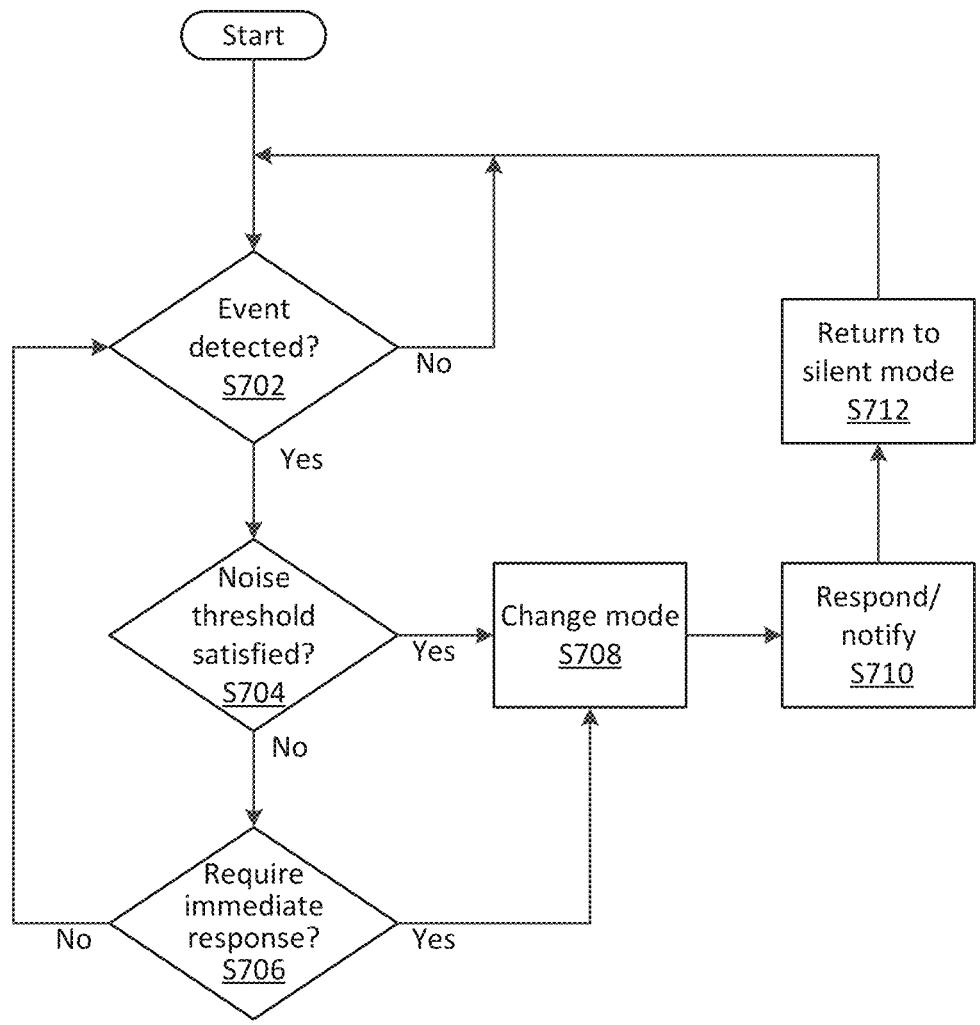
FIG. 7 is a flow chart showing an example method for managing a notification mode.

FIG. 7 is a flow chart showing an example method for managing a notification mode. The method of FIG. 7 may be performed by a mobile device in an ad hoc group or by a mobile device that is not part of an ad hoc group. In step S702, a mobile device in silent mode may monitor for an event having an associated notification or that otherwise may potentially involve generation of a vibration (e.g., a vibration signal in response to a device-to-device communication). The mobile device may determine, based on detecting such an event, whether to generate a vibration or to allow that vibration to be deferred or omitted. Examples of events that may be detected in step S702 include receipt of a communication (e.g., receipt of an e-mail, a text message, an instant message, an incoming voice and/or video call, etc.), occurrence of a calendar event (e.g., a current time and/or date coinciding with a time and/or date for which a calendar application may store data indicating a scheduled activity), receipt of a device-to-device communication from another mobile device in an ad hoc group, etc.

If an event is not detected, and as shown by the "no" branch from step S702, step S702 may be repeated until an event is detected. The method may proceed to step S704 based on detection of an event. In step S704, the mobile device may determine if a noise level is above a threshold, or if a threshold is otherwise satisfied. If so, then maintaining silent mode may not be useful, and providing a notification may be acceptable. For example, if other mobile devices in an immediate vicinity have recently generated notification vibrations (e.g., ringtones, tactile vibrations) and generated distractions to persons in the vicinity, providing an additional notification vibration may be acceptable.

The determination of step S704 may be made in any of numerous ways. For example, the mobile device may determine whether it has detected a notification vibration from another mobile devices within an immediately preceding time period (e.g., 30 seconds), whether it has detected a threshold number of notification vibrations from other mobile devices (e.g., three or more) within an immediately preceding time period (e.g., 90 seconds), whether an ambient noise level has been above a threshold level for an immediately preceding time period, and/or whether other metrics have been satisfied. Different thresholds may be used for different events, at different times, at different locations, and/or based on other criteria, or a single threshold may be used.

If the detected noise level satisfies a threshold in step S704, the mobile device may change from silent mode to sound mode or tactile vibration mode in step S708. The determination of whether to changed-to mode may be based, e.g., on a previously-provided user preference. In step S710, the mobile device takes appropriate action based on the detected event. If the event has an associated notification, the mobile device may generate a notification vibration. If the event requires the mobile device to generate a vibration signal in response to a device-to-device communication, the mobile device may generate that vibration signal. After taking action based on the detected event, the mobile device may return to silent mode (step S712) and repeat step S702.

If the mobile device determines in step S704 that a threshold is not satisfied, the mobile device may determine in step S706 whether the event is sufficiently important to require an immediate response. For example, a user of the mobile device may have configured the mobile device to recognize certain types of communications and/or communications from certain sources as high priority, and may wish to be notified of such communications regardless of other circumstances. As another example, a device-to-device communication from another mobile device may require an immediate response in order for an ad hoc group to function.

If the event is determined to be sufficiently important in step S706, the method may proceed to step S708. If the event is not determined to be sufficiently important in step S706, the method may return to step S702, and the response to the detected event may be handled using one or more other methods. For some types of events, e.g., device-to-device communications that are not critical and that can be ignored completely, no other action may be taken. For some types of events, a notification may be suspended until a later time.

Figure 8A:
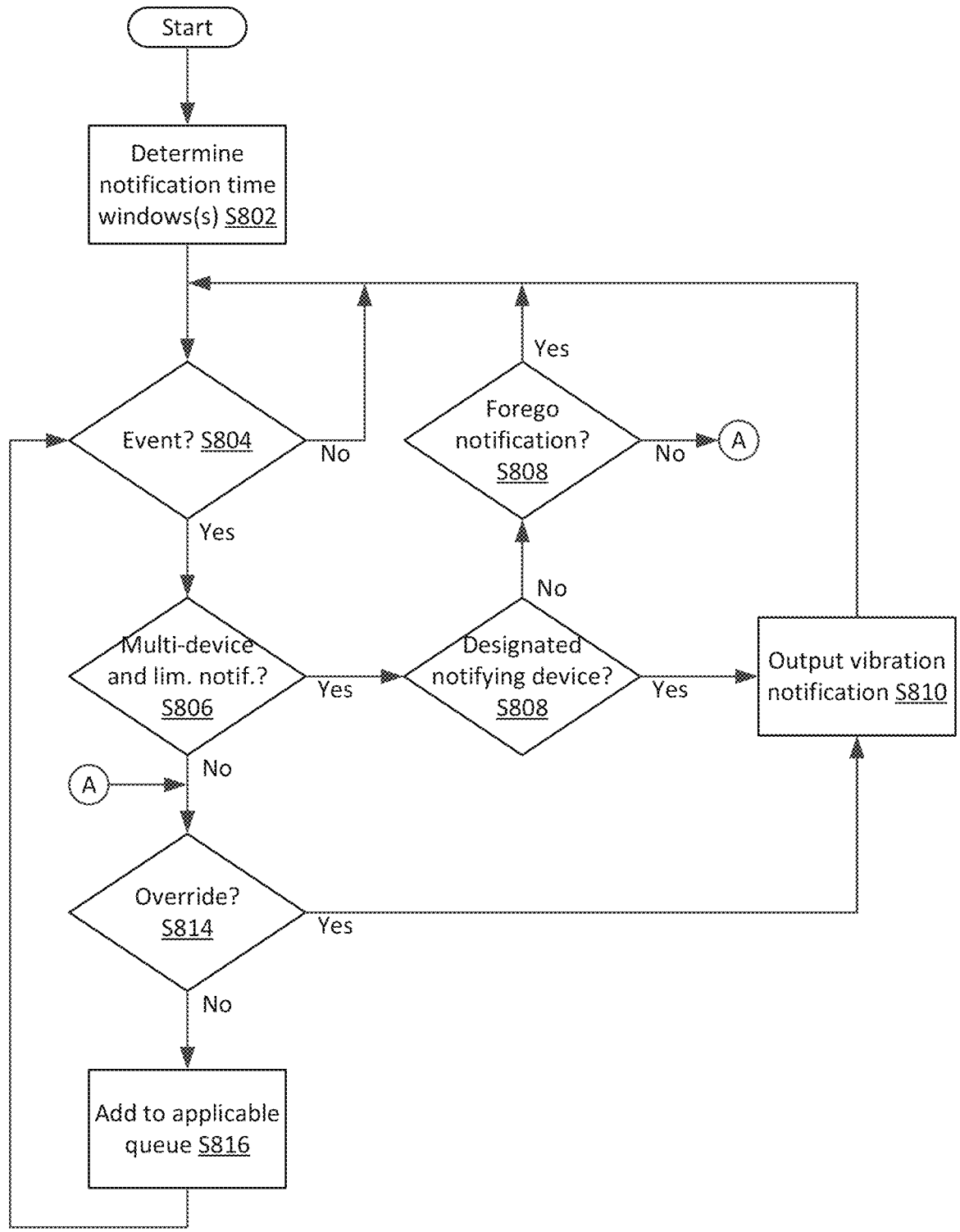
FIGS. 8A and 8B are flow charts showing example methods for suspending a notification vibration.

FIG. 8A is a flow chart showing an example method for suspending a notification vibration. A mobile device may, after detecting an event having an associated notification, suspend generation of that notification until the occurrence of a notification time window. A notification time window may include a notification time period duration and a suspension time period duration, with the notification time periods separated by the suspension time periods. For example a notification time window may include notification time period of duration n (e.g., 15 seconds), followed by a suspension period of duration s (e.g., 15 minutes), followed by another notification time period of duration n, followed by a suspension period of duration s, etc. If an event is detected during a suspension time period, an associated notification for the event is deferred until the next notification time period. When the next notification time period occurs, the notification for the event may be generated. The method of FIG. 8A may be performed by a mobile device in an ad hoc group or by a mobile device that is not part of an ad hoc group.

In step S802, a mobile device may determine one or more notification time windows. Different time windows may apply to different types of events. For example, one type of event may be a communication type (e.g., text messages) considered higher priority and for which a suspension time period between notification time periods is relatively short. Another event type may be a communication type (e.g., emails) considered lower priority and for which a suspension time period between notification time periods is relatively long. For one or more event types (e.g., voice calls, voice calls from specified sources, other communications from specified sources), notifications may not be suspended at all, e.g., a notification time window may have a non-zero value for the notification time period and a zero value for the suspension time period.

Notification time windows can be determined in various ways. For example, when a mobile device joins an ad hoc group, notification time windows applicable to all mobile devices in the ad hoc group may be provided by a managing mobile device and/or by an ad hoc group server 122. A managing mobile device of an ad hoc group, an ad hoc group server 122, and/or a mobile device that is not in an ad hoc group may determine notification time windows based on default values for various event types, based on user input when creating an ad hoc group, and/or in other ways.

Notification time windows may also or alternatively be based on environmental conditions. For example, in quiet environments, one or more notification time windows may be adjusted so as to increase suspension time periods, whereas in less quiet environments, suspension time windows of one or more notification time windows may be shortened. Notification time windows may also or alternatively be based on schedule data in a calendar or other application, based on location data from a GPS or other application, and/or based on other data. In an ad hoc group, one or more notification time windows may be synchronized among group members so that the notification time periods occur at the same time for all mobile devices in the group and so that the suspension time periods occur at the same time for all those mobile devices.

In step S804, the mobile device determines if it has detected an event having an associated notification. If the mobile device is also performing the method of FIG. 7, a detection in step S804 may be based on a "no" result in step S706. If an event has been detected, in step S806 the mobile device determine if the detected event applies to multiple mobile devices and requires immediate notification of some of those devices.

Some types of events may apply to multiple mobile devices. For example, an email or text message may be addressed to multiple mobile devices. As to some such events, it may be desirable to immediately notify less than all of those devices. For example, an email from a company executive may be directed to all members of a department in the company. Some of the recipients (e.g., a department head and a senior engineer) may need to know about that email immediately, while other department members may only have received the email for informational purposes. In step S806, the mobile device may determine if the detected event applies to multiple mobile devices and if some of those mobile devices should immediately generate a notification. If both determinations are not in the affirmative, the mobile device may perform step S814, discussed below. If both determines are in the affirmative, the mobile device may determine in step S808 whether it is one of the mobile devices that should immediately generate a notification. If so, in step S810 the mobile device may output a vibration notification. The mobile device may also output a visual notification. From step 810, the mobile device may repeat step S804.

If the mobile device determines in step S808 that it is not one of the mobile devices that should immediately generate a notification, the mobile device determines in step S812 whether it should generate a notification in the applicable notification time window, or if it may forego notification. If the latter, the mobile device may repeat step S804. If the former, the mobile device may perform step S814.

In step S814, the mobile device may determine if there are any override conditions that indicate a notification should be provided immediately. Such conditions could be similar to conditions described in connection with step S704 (e.g., if the mobile device is not also performing the method of FIG. 7), and/or may include other conditions. For example, based on calendar or other data, the mobile device may recognize that it is in a location of a conference or other meeting where conversation is expected. If conversation ceases, that may indicate the meeting is in recess or other condition in which there is less concern about distractions from notifications. If a lull in the conversation is detected, a notification may be generated right away. As another example, communications from specified sources (e.g., a phone call from a telephone number associated with a specific individual) may be considered high priority and requiring immediate notification. If an override condition is determined in step S814, the mobile device may perform step S810.

If an override condition is not determined instep S814, the mobile device may suspend notification of the detected event in step S816. The mobile device may add an indicator of the event to a queue of indicators for events for which notifications are to be generated at the next notification time period for the relevant event type. The mobile device may proceed from step S816 to repeat step S804.

Figure 8B:
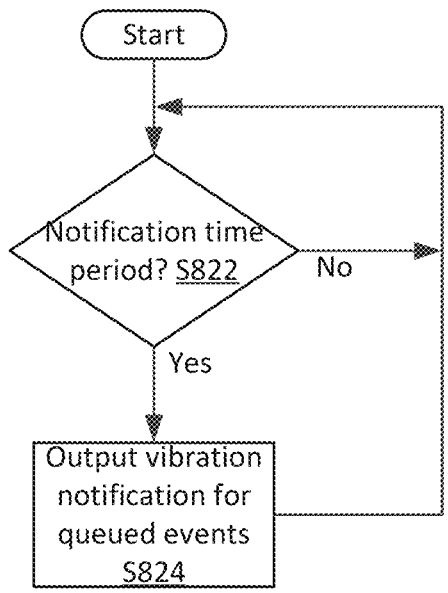

FIG. 8B is a flow chart showing a method for suspending a notification associated with a detected event. A mobile device may perform the method of FIG. 8B in connection with the method of FIG. 8A. A mobile device may separately perform the method of FIG. 8B (e.g., in parallel processing threads) for each of multiple notification time windows (e.g., for each of the time windows determined in step S802). In step S822, the mobile device may determine if the notification time period of a notification time window coincides with the time of performing step S822 or other designated time. If not, step S822 may be repeated. If so, vibration notifications may be output for each of the events that may be queued for notification (step S824). The vibration notification(s) may include an audible sound (e.g., a ringtone) and/or a tactile vibration. Visual notification may also be output in step S824. The mobile device may proceed to repeat step S822.

In an ad hoc group, one mobile device may generate a vibration to indicate that a scheduled activity, e.g., a company team meeting, will start in five minutes. The other mobile devices may detect the vibration and, based on detecting the vibration, inhibit generation of a vibration for notifying the same activity. A mobile device that inhibits a vibration in that circumstance may display a visual indicator of the activity.

Mobile devices in an ad hoc group may generate vibration signals to indicate the presence of those mobile devices and/or their associated users for a meeting or other scheduled event. For example, different codes may be assigned to mobile devices of activity participants when an activity schedule and a participants list are generated. A first code assigned to a first participant may include an activity identifier for identifying the scheduled activity and a first participant identifier for identifying the mobile device of the first participant. A second code assigned to a second participant may include the activity identifier and a second participant identifier for identifying the mobile device of the second participant. A mobile device may generate a vibration signal including its respective assigned code. Other mobile devices may determine, based on detected vibration signals and the activity data in a scheduling application, a participant list, and may determine mobile devices currently present for the scheduled activity. An absentee may be determined based on absence of a vibration signal from the mobile device associated with the absentee. The ad hoc group server 122 or a participant's mobile device, e.g., the managing mobile device among the mobile devices in the ad hoc group, may send a text message or other form of message or signal (e.g., an automatic phone call), via a mobile network, to the mobile device of the absentee so that the absentee can receive the message as a reminder for the scheduled activity. A user interface may be provided to the mobile devices in the ad hoc group to show information about the participants and absentees. The user interface of each mobile device participating in the scheduled event may also provide an input interface to generate the reminder message or a reminder call to one or more absentees.

An ad hoc group server 122 may transmit, from itself or cause transmission from a content server (e.g., the content server 106) to mobile devices, a requested asset so that the mobile devices may begin to share, execute, or playback of the asset during a scheduled activity. For example, mobile devices in an ad hoc group may receive employee training video content for the users who are participating in a training session of a company.

Figure 9:
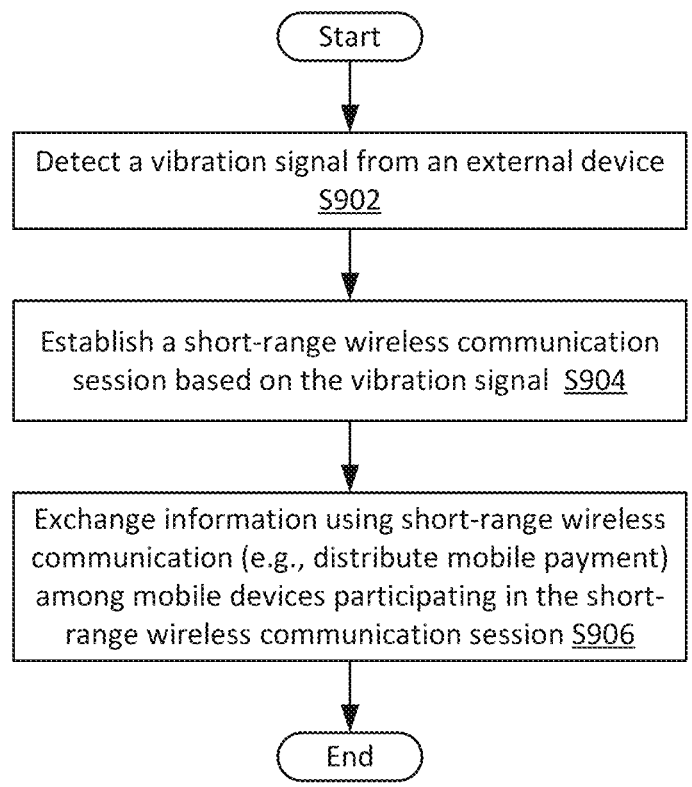
FIG. 9 is a flow chart showing an example method for establishing a short-range wireless communication session using a vibration signal of a mobile device.

FIG. 9 is a flow chart showing an example method for using a vibration signal to establish a short-range wireless communication session between mobile devices. The method of FIG. 9 may be performed independently by each of multiple mobile devices, e.g., by mobile devices in an ad hoc group and/or by mobile devices not in an ad hoc group. In step S902, a mobile device may detect a vibration signal generated by a nearby mobile device. The vibration signal may alert one or more nearby mobile devices to enable a short-range wireless communication, such as Bluetooth, Wi-Fi, Wi-Fi direct, Near Field Communication (NFC), ZigBee, infrared communication, etc. The short-range wireless communication may have a wireless communication range less than the radio communication range of an LTE or other wide area wireless network. The mobile device may also send a short-range wireless signal along with the vibration signal such that other mobile devices may set up a communication session using protocols of the short-range wireless signal in step S904. For example, a first mobile device may send a Bluetooth signal and a vibration signal so that a second mobile device may detect the vibration signal and enable a Bluetooth module to monitor the Bluetooth signal sent from the first mobile device. The vibration signal may include information for a short-range wireless communication set-up (e.g., a temporary credential code to be used, by the second mobile device, in a Bluetooth pairing with the first mobile device). The security of the communication may be enhanced if the first mobile device changes the temporary credential code when generating a new vibration signal for a subsequent Bluetooth pairing. The temporary credential code may be a temporary passcode to form a Bluetooth pairing with the nearby mobile device. The temporary credential code may include a MAC address of the mobile device, a PIN code, etc. The temporary credential code may be provided by an ad hoc group server 122, via a mobile communication network or other networks, to mobile devices registered in the same ad hoc group. Since the vibration signal may not be detected by some mobile devices located farther than the detection range of the vibration signal, some mobile devices may not pair with the first mobile device even though those mobile devices are located within the communication range of the short-range wireless communication (e.g., within the range of the Bluetooth communication).

In step S906, the paired mobile device and the nearby mobile device(s) may exchange information using short-range wireless communication. For example, the mobile device(s) may perform various transactions, such as split mobile payment amounts between the mobile devices participating in the short-range wireless communication session. For example, a plurality of mobile devices may communicate via vibration signals and form a temporary group to share a mobile payment for a certain service, e.g., a restaurant bill or a taxi-cab fare.

A plurality of individuals may visit a restaurant and place their mobile devices on a dining table, and an ad hoc group of those devices may be formed. Each of the mobile devices may send, to the ad hoc group server 122, the location information of the mobile device (the restaurant), a pattern of vibration signals shared by the mobile devices, and device identification of the mobile device. The group server 122 may analyze the received information and form a group for the plurality of the mobile devices. Mobile devices may be considered co-located if they are located within a maximum distance threshold from one another. The group server 122 may send device information of the mobile devices to each mobile device in the group so that each mobile device in the group may identify detailed device information of all mobile devices in the group. The device information may include MAC addresses of the mobile devices, a temporary access code for a short-range wireless communication among the mobile devices in the group, and/or other information.

A plurality of mobile devices in the same group may receive information targeted for the group. For example, at a dinner table in a restaurant, an electronic-version menu may be provided to each mobile device in a temporary group (an ad hoc group). Each user may select foods by clicking menu items displayed on his/her mobile device. One user may select a bottle of wine to be shared by the ad hoc group. A mobile device within the group may receive an electronic bill issued by the restaurant. The electronic bill may be processed and the payment amount may be divided and each divided amount may be sent to mobile devices in the temporary group. For example, the electronic bill may indicate a total of $120 including $20 of shared beverages (e.g., a bottle of wine). Each of five mobile devices will be charged with $24 ($20 for the meal and $4 for the split charge for the shared beverages).

An ad hoc group may be formed by a plurality of mobile devices located in the same vehicle, such as a taxi-cab. The location information change and accelerometer data of the plurality of mobile devices may be substantially the same because the mobile devices may be moving together in the same taxi-cab. Each mobile device may send the location information, the accelerometer data, and detailed device information to the ad hoc group server 122. The mobile devices having substantially the same or similar location information and accelerometer data may be grouped in the same ad hoc group. The taxi-cab bill may also be split among the plurality of mobile devices in the ad hoc group. The anonymity of the users of the plurality of mobile devices may be maintained if the ad hoc group server 122 does not send detailed device information to each mobile device in the group. The group formation may be dissolved after the payment distribution or may be changed if users of one or more mobile devices get out of the taxi-cab after the payment distribution.

Figure 10:
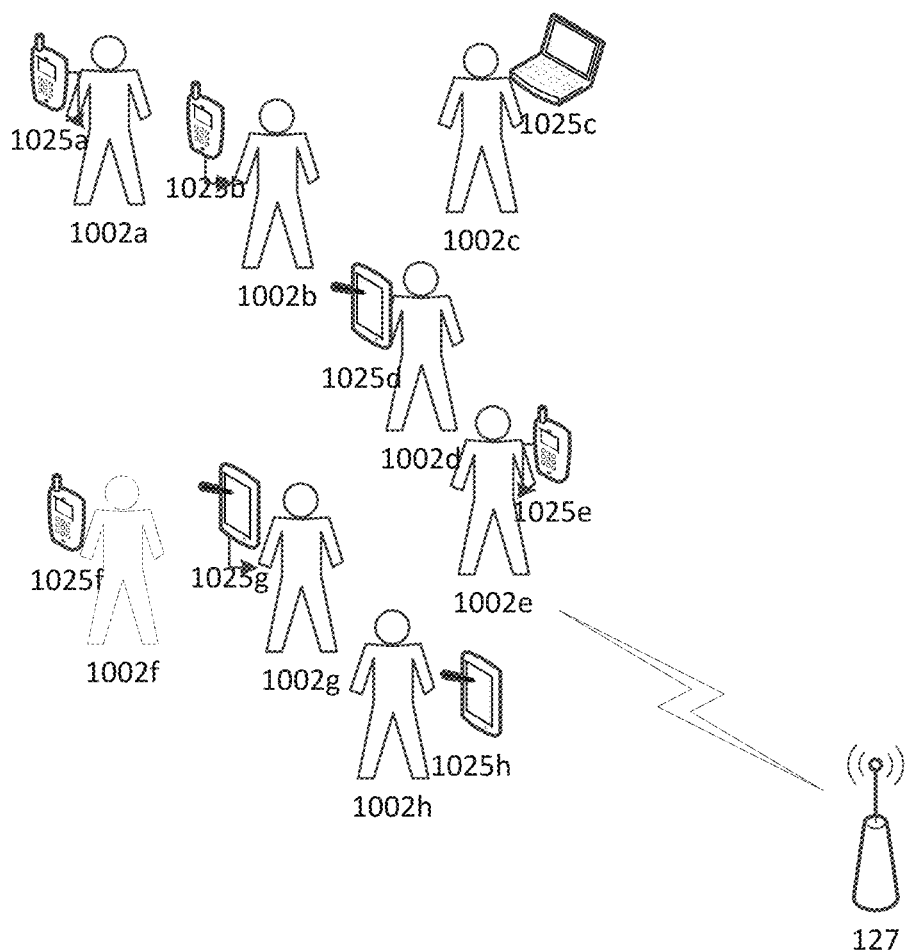
FIG. 10 shows a plurality of mobile devices forming an ad hoc group by using a vibration communication and a mobile communication.

Once an ad hoc group of mobile devices is formed, various types of information relevant to the group may be provided to each mobile device in the group. FIG. 10 shows a plurality of mobile devices 1002a-h forming an ad hoc group by using a vibration communication with nearby mobile devices and using a mobile communication with an ad hoc group server 122 via the base station 127. The ad hoc group server 122 may determine, based on GPS and/or other location information from the mobile devices 1002, where the mobile devices 1002 are located (e.g., a baseball stadium, a local bar, a restaurant, a moving car, a fitness club, etc.). The ad hoc group server 122 may gather information regarding the location and provide, via a wireless network, the gathered information to the mobile devices in the group. For example, at a baseball game, on a car trip, in a fitness club, or in some other location, many individuals gather together with their mobile devices. After forming an ad hoc group, new relevant to users associated with mobile devices of the ad hoc group may be provided to the mobile devices.

Users of mobile devices in an ad hoc group may communicate with each other to exchange information. If two or more individuals are on bicycles or treadmills at a fitness club, for example, the individuals may compete with each other by generating, on each mobile device of users engaged in the same activity, a user interface that displays the status of the individuals' exercise records.

The activities and/or conversations of mobile devices in an ad hoc group may be summarized and pushed to each mobile device in the ad hoc group before the ad hoc group is dissolved. This type of summary may be accumulated in a daily log of activities for a mobile device. For example, a list of summarized activities of a mobile device may include 1) a meeting with coworkers A, B, and C, 2) lunch at a restaurant with coworkers A and B, 3) dinner at a steak house with friend D, and 4) a running competition at fitness center A with two anonymous individuals. The user of the mobile device may scroll through the summarized list of events and review what he/she did during the day by collocating with other individuals and send chats, pictures, or other data to the individuals who were in those meeting or events.

A software application for controlling ad hoc group membership, managing user ad hoc group preferences, performing other operations associated with ad hoc groups, and/or performing other operations described herein (e.g., without being in an ad hoc group) may be installed on mobile devices. The application may be responsible for enabling an individual to select one or more user preferences to manage temporary pairing with other mobile devices. A user preference may include an opt-in option to permit a temporary pairing (e.g., a temporary mobile hotspot tethering or Bluetooth pairing) to nearby mobile devices after receiving a vibration signal sent from other nearby mobile devices. If an individual has not opted in to the temporary pairing, a mobile device of the individual may prevent other mobile devices from pairing with that mobile device. Another user preference may include an opt-out option if the mobile device's battery falls below a minimum battery level threshold in order to conserve power of the mobile device. As an example, a mobile device may permit a temporary pairing if its battery level is greater than or equal to a minimum battery level but may block the temporary pairing if its battery level is less than the minimum battery level.

Figure 11A:
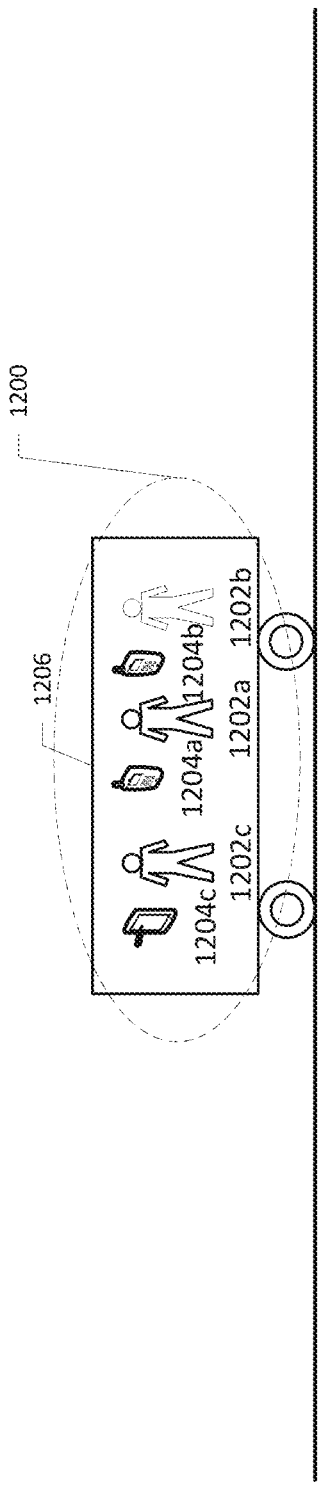
FIGS. 11A and 11B show additional examples of mobile devices that may form ad hoc groups.
Figure 11B:
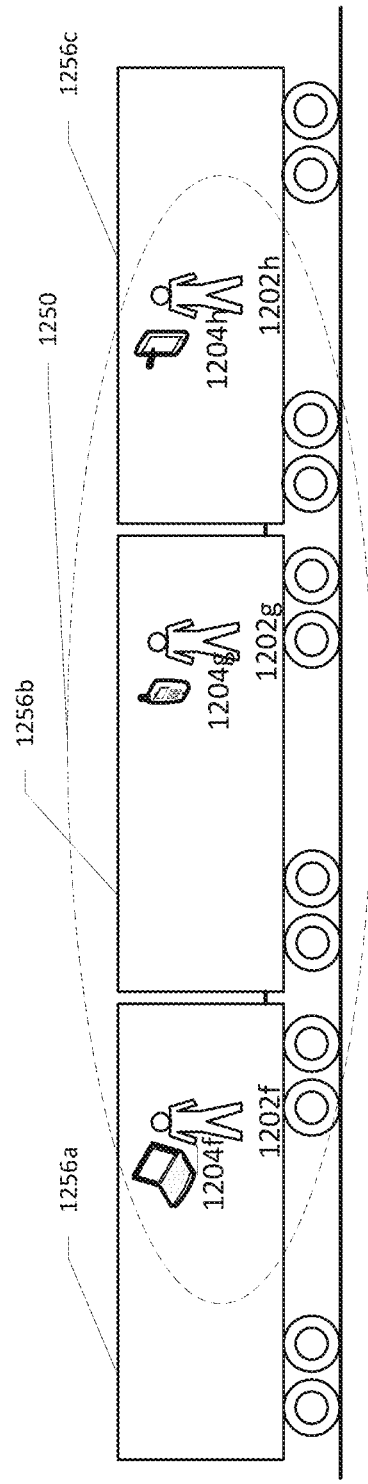

After creating an ad hoc group, a first mobile device may use mobile data of a second mobile device using mobile hotspot tethering. FIGS. 11A and 11B show examples of mobile devices that may form ad hoc groups. An individual 1202a may have used all of a per-month data cap applicable to the device 1204a and may want to communicate wireless data via other mobile device while riding in a vehicle 1206 (e.g., a bus). The individual 1202a may control the mobile device 1204a to generate a vibration signal that requests a temporary mobile hotspot tethering. The mobile devices 1204b and 1204c may detect the vibration signal generated by the mobile device 1204a, and may form an ad hoc group 1200 with a mobile device 1204a. The ad hoc group 1200 may be formed via the ad hoc group server 122 described above. For example, mobile devices 1204a-c may send their location data (e.g., GPS data), a code determined by the vibration pattern communicated among the mobile devices 1204a-c, and identities of the mobile devices 1204a-c. The mobile device 1204a may use a mobile hotspot tethering by connecting to the mobile device 1204b. The mobile device 1204b may generate an electronic bill for using the mobile data through the mobile device 1204b and send the bill to the mobile device 1204a. In order to maintain the anonymity of the users of the mobile devices in the ad hoc group, the electronic bill may be generated and sent through the ad hoc group server 122.

In FIG. 11B, individuals 1202f-h may be in a train having cars 1256a-1256c. Mobile devices 1204f-h of the individuals 1202f-h may form an ad hoc group. Once the mobile devices 1204f-h are connected to each other through a short-range wireless communication protocol, (e.g., Bluetooth, Wi-Fi, mobile hotspot, etc.), the mobile devices 1204f-h may maintain the ad hoc group 1250 as long as the mobile devices 1204f-h are located within the communication range of the established short-range wireless communication protocol. During the short-range wireless communication access, the mobile devices 1204f-h may restrict access to certain data, e.g., the device information of the mobile devices 1204f-h, user profile of the individuals 1202f-h, etc.

Figure 12:
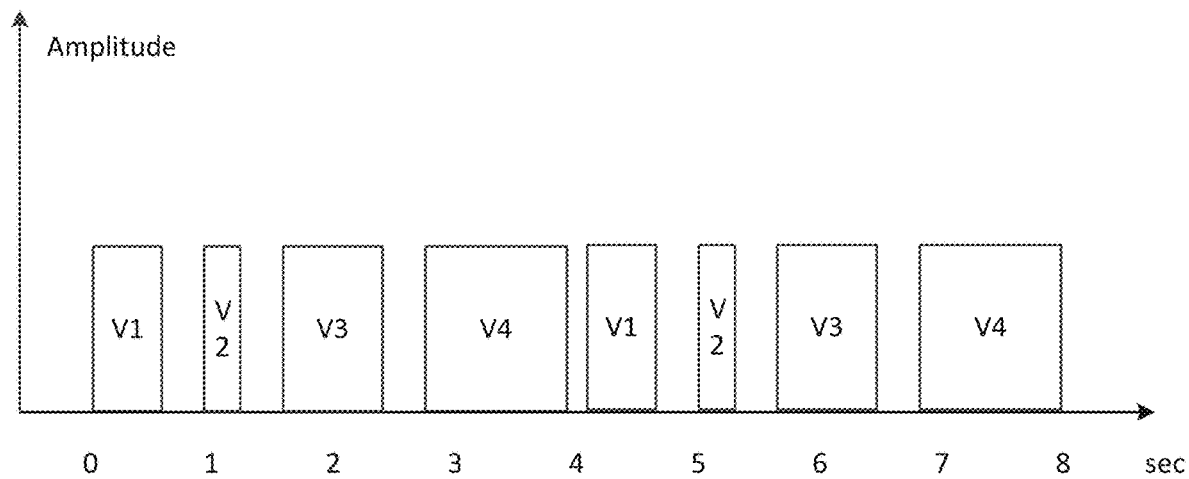
FIG. 12 shows an example vibration pattern generated or detected by a mobile device.

FIG. 12 shows an example vibration pattern generated or detected by a mobile device. The pattern of FIG. 12 includes four pulses V1, V2, V3, and V4, which each of pulses V1-V4 having the same amplitude but different pulse widths (e.g., different durations). Although FIG. 12 shows time varying pulses, the frequency of vibrations in a pulse, the amplitude of a pulse, and/or a combination thereof may also or alternatively vary in order to implement different vibration patterns.

Figure 13:
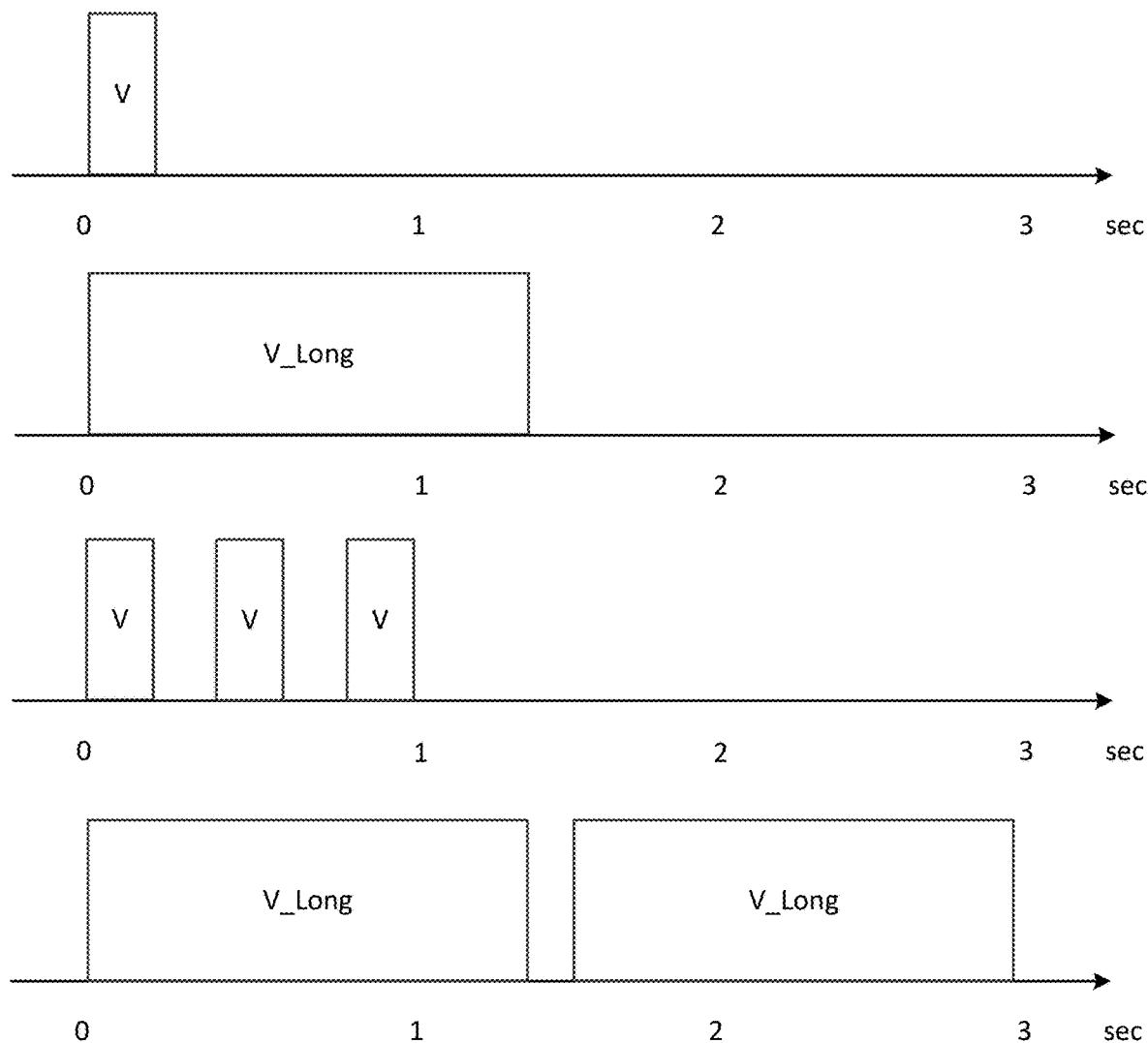
FIG. 13 shows example vibration patterns assigned to mobile devices in an ad hoc group.

FIG. 13 shows an example of different vibration patterns. If each mobile device randomly generates a unique pattern, it is less likely that two mobile devices select the same vibration patterns. For example, a mobile device may derive a unique vibration pattern from the MAC address, IMEI, and/or the phone number of the mobile device. However, for vibration notifications within a short period time (e.g., 3 seconds), predetermined patterns (e.g., patterns shown in FIG. 13) may be used.

Different vibration patterns (e.g., the vibration patterns shown in FIG. 13) may be assigned to mobile devices in an ad hoc group. A variety of mobile devices may store preconfigured vibration patterns. For example, as shown in FIG. 13, one short vibration pulse, one long vibration pulse, three short vibration pulses, and two long vibration pulses may be preconfigured in a variety of mobile devices. Other vibration patterns may also be preconfigured in certain mobile device types. Vibration patterns may be assigned to a mobile device temporarily (e.g., in connection with a specific ad hoc group) or persistently. In an ad hoc group, a quantity of unique patterns may be selected and distributed to the mobile devices in the ad hoc group. Each mobile device in an ad hoc group may generate a unique vibration pattern that replicates, mimics, or is derived from a ringtone sound, phone number, serial number, and/or other identity assigned to that mobile device. A mobile device may generate a different vibration pattern by adding an extra vibration pulse to one or more vibration patterns detected from one or more nearby mobile devices (e.g., the last vibration pattern detected from a nearby mobile device).

Automatic assignments of different vibration patterns to an ad hoc group may be performed. For example, the user 202d in FIG. 2 may place the mobile device 225d on the table 206 after all other mobile devices 225a-225c, 225e-225g were placed on the table 206. The mobile device 225d may determine that it is placed on an object (e.g., the table 206), and generate a vibration signal using a vibration pattern A. Other mobile devices 225a-225c, 225e-225g may detect the vibration pattern A originated from the mobile device 225d. In response to the detected vibration pattern A, the mobile devices 225a-225c, 225e-225g may sequentially generate vibration signals using their own vibration pattern. The time gap between the reception of the vibration pattern A and the transmission of the responsive vibration signals ("reply vibration signals") by the mobile devices 225a-225c, 225e-225g may be determined differently according to their own vibration pattern or other ordering schemes.

Each vibration pattern may have a unique, randomly-selected response delay time, e.g., between 0 to 1 second. For example, the mobile device 225a may respond in 0.4 second using a vibration pattern B if, for example, the pattern B is associated with a 0.4 second of a response delay time. The mobile device 225b may not respond within 1 second although it is assigned with a vibration pattern C associated with a 0.7 second of a response delay time because the mobile device 225b senses the vibration pattern B originated from the mobile device 225a before generating the vibration pattern C. Thus, the mobile device 225a may determine the termination of the vibration pattern A from the mobile device 225d, calculate the response delay time (0.4 sec) after the termination of the vibration pattern A, and generate its own vibration pattern B. The mobile device 225b may detect the vibration pattern B before the expiration of its response delay time (0.7 sec). Thus, after detecting the termination of the vibration pattern B generated from the mobile device 225a, the mobile device 225b may wait for 0.7 second and may generate the vibration pattern C. In this way, the mobile devices 225a-225c, 225e-225g may generate vibration signals sequentially and avoid collisions of vibration signals.

Vibration timing determination may also or alternatively be performed in other ways. For example, if mobile device 225a is placed on the table 206 for the first time, it may monitor other vibration signals for a first time period after generating a vibration signal. If it does not detect a responsive vibration signal during the first time period, it may determine itself as an independent vibration synchronization source, which determines its own response delay time and its vibration pattern. Then, the mobile device 225b may be placed on the table 206 as the second device and may generate a vibration signal and monitor a vibration signal from other devices during a second time period after generating the vibration signal.

The vibration signals generated by the mobile devices 225a and 225b may initially be the same or very similar to each other. If the mobile device 225b recognizes the same or similar vibration pattern of the mobile device 225a during the second time period, the device 225b may select and generate a different vibration pattern so that the device 225a may maintain its vibration pattern and use it exclusively in the ad hoc group. The mobile device 225b may measure the response delay time of the device 225a and may set its own response delay time different from the response delay time of the device 225a. For example, the device 225b may measure the time gap between the vibration signal generation by the device 225b and the responsive vibration signal generated by the device 225a.

If the device 225b does not recognize the same or similar vibration pattern from the device 225a during the time period, it may maintain its selected vibration pattern. The mobile device 225a may detect the vibration pattern of the device 225b. In response, the device 225a may generate a vibration pattern after the response delay time set by the device 225a. If the vibration patterns are different, an adjustment process may not be necessary. If the device 225b selected the vibration pattern identical to the vibration pattern of the device 225a, it may select a different vibration pattern and respond again to the device 225a with the changed vibration pattern. Then, the device 225a may recognize that the device 225b selected a vibration pattern different from the vibration pattern of the device 225a. In this manner, other mobile devices subsequently placed on the same table may select different vibration patterns and different response delay times.

The mobile devices 225 may determine a response order according to the placement order on the table. For example, if the devices 225a, 225b, and 225c are placed on the same table sequentially, the device 225a may generate a vibration signal before the device 225b generates a vibration signal, and the device 225b may generate its vibration signal before the device 225c generates a vibration signal. For example, the device 225a may first generate a vibration signal when placed on a table. If the device 225a does not detect a responsive vibration signal within a threshold time period, it may determine that it is the first device in an ad hoc group in the surrounding environment (e.g., on the table). Second, the device 225b may generate a vibration signal when placed on the table. Third, the device 225a may generate a responsive vibration signal within the threshold time period. The device 225b may detect the responsive vibration signal and may determine that it is the second device in the ad hoc group. Fourth, the device 225c may generate a vibration signal when placed on the table. Fifth, the device 225a may generate a responsive vibration signal within the threshold time period, and then, the device 225b may generate a responsive vibration signal within the threshold time period. Because the device 225a precedes the device 225b with respect to the placement order on the table, the device 225a may respond before the device 225b, in response to the vibration signal generated by the device 225c. Alternatively, the response order may be the reverse order of the placement order. However, when a plurality of mobile devices are placed on the same table almost simultaneously, other methods described above may be used as well. For example, different vibration patterns may be detected simultaneously if the mobile devices 225 use different frequencies in generating their vibration patterns. If a limited number of frequencies are available in generating vibration patterns, different combinations of available frequencies may be used to increase the quantity of different vibration patterns based on varying frequencies.

If the device 225b is picked up and placed back on the same table 206 within a certain threshold time period, the device 225b may send out a short pulse confirming that the device 225b is on the same table 206 as before. This short absence does not require the device 225b to conduct the vibration pattern assignment process again.

A mobile device (or other types of communication devices) may perform the functions of the ad hoc group server 122 described herein. For example, the mobile device performing the functions of the ad hoc group server 122 may coordinate with other mobile devices or other ad hoc groups. The ad hoc group server 122 and mobile devices may perform various other operations described below.

The mobile devices may send GPS location information to the ad hoc group server 122 so that the ad hoc group server 122 may determine that the mobile devices are collocated. The mobile devices may communicate with the ad hoc group server 122 via the access points 127 (e.g., a base station or a Wi-Fi router). The location information may include, e.g., a set of longitude and latitude coordinates of a mobile device. The mobile devices may send a timestamp of the vibration signal generated by the first mobile device. For example, if the first mobile device generates a vibration signal for a certain time period, other nearby devices may detect the start time, end time, and the duration of the vibration signal. A timestamp may include one or more of the start time, end time, and the duration of the vibration signal. Using the timestamp, the ad hoc group server 122 may more accurately identify nearby mobile devices that detected the vibration signal of the first mobile device.

The ad hoc group server 122 may determine a plurality of mobile devices to be added to the ad hoc group by receiving a device code and the GPS information from each mobile device. The ad hoc group server 122 may determine identities of the mobile devices by receiving identity information of each mobile device. The ad hoc group server 122 may disclose only limited portions of identities of the mobile devices to the ad hoc group so that anonymity of each individual may be maintained. For example, the ad hoc group server 122 may receive mobile phone numbers, IMEIs, MAC addresses, user profiles, and/or other identifying data from each mobile device, but the ad hoc group server 122 may provide only the nicknames of individuals associated with the mobile devices.

If the detailed identities of the group members are not shared among the users of the mobile devices, one or more users in the ad hoc group may send a request to another user to obtain more detailed personal information of the other user. The detailed personal information may include a mobile phone number, a chatting application ID, the real name of the other user, etc. Such a request for detailed personal information may be transferred to the other user via the ad hoc group server 122. If the other user approves the release of the detailed personal information, the ad hoc group server 122 may release the detailed personal information of the other user to one or more members in the ad hoc group who requested the detailed personal information. The other user may be provided with a user interface to select which personal information may be released. For example, the other user may approve releasing his/her mobile phone number while not releasing his/her address or real name. Further, the other user's mobile device may have an e-business card registered in an application, such as an e-mail application. Certain fields of the business card may be redacted or modified by user selections and a modified version of the e-business card may be provided to other users in the ad hoc group.

Although examples are described above, the various features and steps may be combined, divided, omitted, rearranged, revised or augmented in any desired manner. Various alterations, modifications, and improvements will readily occur to those skilled in art. Such alterations, modifications, and improvements are intended to be part of this description, though not expressly stated herein, and are intended to be within the spirit and scope of the disclosure. Accordingly, the foregoing description is by way of example only, and not limiting.

The invention claimed is:

1. A method comprising:
  detecting, by a computing device and based on determining that the computing device has been placed on an object for a threshold amount of time, a vibration;
  determining that the detected vibration originated from a second computing device;
  forming, based on the determining that the vibration originated from the second computing device, a group comprising the computing device and the second computing device; and controlling, based on the forming the group, and via a motor or linear oscillating vibrator, vibration output by the computing device.

2. The method of claim 1, further comprising:
detecting, by the computing device, an event; and
wherein the controlling vibration output comprises suspending, for a suspension time period, output of a vibration associated with the event.

3. The method of claim 2, further comprising:
determining, at a first time, that a notification time period following the suspension time period coincides with the first time; and
outputting, based on the determining that the notification time period following the suspension time period coincides with the first time, the vibration associated with the event.

4. The method of claim 1, further comprising:
detecting a second vibration generated by another computing device; and
outputting, by the computing device and based on the detected second vibration, a visual notification indicating that the second vibration was not output by the computing device.

5. The method of claim 1, further comprising outputting, by the computing device, a vibration and a visual notification, wherein the visual notification indicates that the output vibration was output by the computing device.

6. The method of claim 1, further comprising:
determining, based on a vibration pattern of the detected vibration, a different vibration pattern for the computing device; and
outputting the different vibration pattern to the second computing device.

7. The method of claim 1, further comprising:
establishing, by the computing device and based on the detected vibration, a short-range wireless communication session with the second computing device.

8. The method of claim 1, further comprising:
determining, by the computing device, an event;
determining that the event is associated with a plurality of computing devices that includes the computing device;
determining that the computing device is not in a subset of the plurality of computing devices, designated to output a vibration based on occurrence of the event; and
forgoing output, by the computing device and based on the determining that the computing device is not in the subset, of a vibration associated with the event.

9. The method of claim 1, further comprising:
determining, by the computing device and based on the detected vibration, a code to join the group;
sending, by the computing device and to a group server, the code; and
receiving, by the computing device and from the group server, shared data associated with the group.

10. The method of claim 1, further comprising:
determining, by the computing device, an event;
determining, via a noise sensor, that a noise level, within a threshold distance from the computing device, satisfies a noise level threshold; and
outputting, based on the determining that the noise level satisfies the noise level threshold, a vibration associated with the event.

11. The method of claim 10, wherein the determining that the noise level satisfies the noise level threshold comprises detecting a vibration from another computing device within a preceding time period.

12. The method of claim 1, further comprising:
determining, by the computing device, an event;
determining, via a noise sensor, that a noise level, within a threshold distance from the computing device, does not satisfy a noise level threshold; and
suspending, based on the determining that the noise level does not satisfy the noise level threshold, output of a vibration associated with the event.

13. The method of claim 1, wherein the computing device is a mobile device,
wherein the detected vibration comprises tactile vibration and sound components associated with the second computing device, and
wherein the controlling vibration output comprises controlling output of tactile vibrations.

14. The method of claim 1, further comprising:
determining, by the computing device, a notification time window associated with an event, wherein the notification time window comprises a notification time period and a suspension time period;
determining, at a first time, that the suspension time period coincides with the first time;
suspending, based on the determining that the suspension time period coincides with the first time, output of a vibration associated with the event;
determining, at a second time, that the notification time period coincides with the second time; and
outputting, based on the determining that the notification time period coincides with the second time, the vibration associated with the event.

15. A method comprising:
determining, by a computing device, an event;
determining, via a noise sensor, that a noise level, within a threshold distance from the computing device, satisfies a noise level threshold; and
outputting, based on the determining that the noise level satisfies the noise level threshold, a tactile vibration, via a motor or a linear oscillating vibrator, associated with the event.

16. The method of claim 15, further comprising:
detecting, from a second computing device, a vibration signal, wherein the vibration signal requests a response vibration signal;
determining that a second noise level, within a threshold distance from the computing device, satisfies the noise level threshold; and
outputting, based on the determining that the second noise level satisfies the noise level threshold, the response vibration signal.

17. The method of claim 15, further comprising:
determining, by the computing device, a second event;
determining that a second noise level, within a threshold distance from the computing device, does not satisfy the noise level threshold; and
suspending, for a suspension time period and based on the determining that the second noise level does not satisfy the noise level threshold, output of a vibration associated with the second event.

18. A method comprising:
detecting, by a computing device, a vibration;
determining that the detected vibration originated from a second computing device;
joining, based on the detected vibration and based on a second signal from a third computing device, a group comprising the computing device and the second computing device; and suspending, based on the joining the group and by the computing device, output of a vibration, via a motor or a linear oscillating vibrator.

19. The method of claim 18, wherein the second signal is a vibration signal or a radio frequency signal.

20. The method of claim 18, wherein the suspending comprises suspending, for a suspension time period, output of a vibration associated with an event, the method further comprising:
   determining a suspension time period, from a plurality of suspension time periods, based on an event type.

21. The method of claim 20, wherein the event type comprises a type of communication.

* * * * *

UNITED STATES PATENT AND TRADEMARK OFFICE
CERTIFICATE OF CORRECTION

| | | |
|---|---|---|
| PATENT NO. | : 10,917,180 B2 | Page 1 of 1 |
| APPLICATION NO. | : 16/043235 | |
| DATED | : February 9, 2021 | |
| INVENTOR(S) | : Ross Gilson | |

It is certified that error appears in the above-identified patent and that said Letters Patent is hereby corrected as shown below:

In the Specification

Column 3, Detailed Description, Line 30:
Please delete "HTMLS," and insert --HTML5,--

In the Claims

Column 27, Line 42:
In Claim 8, after "subset" insert --,--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*